(12) United States Patent
Kang et al.

(10) Patent No.: US 9,792,630 B2
(45) Date of Patent: Oct. 17, 2017

(54) SYSTEMS AND METHODS FOR AUTONOMOUS BIDS OF ADVERTISEMENT INVENTORY

(71) Applicants: Daniel Kang, San Francisco, CA (US); David Gregson, San Francisco, CA (US); Ben Bear, San Francisco, CA (US)

(72) Inventors: Daniel Kang, San Francisco, CA (US); David Gregson, San Francisco, CA (US); Ben Bear, San Francisco, CA (US)

(73) Assignee: Vungle, Inc., San Francisco, CA (US)

( * ) Notice: Subject to any disclaimer, the term of this patent is extended or adjusted under 35 U.S.C. 154(b) by 133 days.

(21) Appl. No.: 14/677,957

(22) Filed: Apr. 2, 2015

(65) Prior Publication Data
US 2016/0292746 A1    Oct. 6, 2016

(51) Int. Cl.
*G06Q 30/02*     (2012.01)

(52) U.S. Cl.
CPC ..... *G06Q 30/0275* (2013.01); *G06Q 30/0247* (2013.01)

(58) Field of Classification Search
CPC ........... G06Q 30/0275; G06Q 30/0242; G06Q 30/0247
USPC ................... 705/14.71, 14.41, 14.46
See application file for complete search history.

(56) References Cited

U.S. PATENT DOCUMENTS

| 8,527,352 | B2 * | 9/2013 | Chatwin et al. | 705/14.71 |
| 8,645,199 | B1 * | 2/2014 | Sarkar | G06Q 30/0273 705/14.1 |
| 8,655,727 | B2 * | 2/2014 | Scholl et al. | 705/14.54 |
| 8,768,766 | B2 * | 7/2014 | Ellis et al. | 705/14.43 |
| 2005/0095980 | A1 * | 5/2005 | Chang | 455/3.02 |

(Continued)

FOREIGN PATENT DOCUMENTS

KR     1020070027852     3/2007

OTHER PUBLICATIONS

Gluck, Marissa, "IAB Ad Engagement", *Radar Research*, Dec. 5, 2012, 15 pages.

(Continued)

*Primary Examiner* — David Stoltenberg
(74) *Attorney, Agent, or Firm* — Blakely, Sokoloff, Taylor & Zafman, LLP

(57) ABSTRACT

Methods and systems are described for providing programmatic bidding of advertisement inventory. In one embodiment, an advertising system includes an ad bidding component or module of an ad server and a storage medium coupled to the ad server. The storage medium stores instructions including instructions of the ad bidding component or module. Processing logic is configured to execute the instructions to receive a bid campaign function call for an ad campaign from an advertising entity, determine objectives for the advertising entity including life time value (LTV) for users and return on investment (ROI) for the ad campaign, determine targeted users having characteristics appropriate for satisfying the objectives of the advertising entity, and autonomously determine a dynamic ad bid price parameter and associated group of targeted users that satisfy the objectives of the advertising entity based on having characteristics that satisfy at least three different parameters.

18 Claims, 8 Drawing Sheets

(56) References Cited

U.S. PATENT DOCUMENTS

| | | | |
|---|---|---|---|
| 2006/0212350 A1 | 9/2006 | Ellis et al. | |
| 2008/0147505 A1 | 6/2008 | Davis | |
| 2010/0179856 A1* | 7/2010 | Paretti | G06Q 30/02 705/14.1 |
| 2011/0054997 A1 | 3/2011 | Feuerstein et al. | |
| 2012/0036003 A1* | 2/2012 | Tong | G06Q 30/0207 705/14.39 |
| 2013/0311300 A1* | 11/2013 | Scarborough | G06Q 30/02 705/14.69 |
| 2014/0032316 A1* | 1/2014 | Cormie | G06Q 30/0251 705/14.49 |
| 2014/0222590 A1 | 8/2014 | Chatter et al. | |
| 2014/0280879 A1* | 9/2014 | Skolicki | H04L 69/28 709/224 |
| 2014/0351041 A1* | 11/2014 | Brown | G06Q 30/0246 705/14.45 |
| 2015/0262224 A1* | 9/2015 | Brown | G06Q 30/0246 705/14.45 |
| 2015/0332310 A1* | 11/2015 | Cui | G06Q 30/0244 705/14.45 |
| 2015/0332317 A1* | 11/2015 | Cui | G06Q 30/0247 705/14.46 |
| 2015/0332329 A1* | 11/2015 | Luo | G06Q 30/0267 705/14.58 |
| 2016/0027025 A1* | 1/2016 | Sanders | G06Q 30/0246 705/7.29 |
| 2016/0085521 A1* | 3/2016 | Savliwala | G06F 17/30867 717/108 |
| 2016/0104207 A1* | 4/2016 | Zhao | G06Q 30/0275 705/14.71 |

OTHER PUBLICATIONS

Notification of Transmittal of the International Search Report and the Written Opinion of the International Searching Authority for PCT/US2016/025324 dated Jul. 11, 2016, 14 pages.

* cited by examiner

| AD CAMPAIGN 510 | FUNCTION 520 | FUNCTION 530 | FUNCTION 540 | ... | FUNCTION n |
|---|---|---|---|---|---|
| AD CAMPAIGN 512 | COST 522 | LTV 532 | ROI 542 | ... | ENGAGEMENT RATE 552 |
| AD CAMPAIGN 514 | COST 524 | LTV 534 | ROI 544 | ... | ENGAGEMENT RATE 554 |
| AD CAMPAIGN 516 | COST 526 | LTV 536 | ROI 546 | ... | ENGAGEMENT RATE 556 |
| AD CAMPAIGN 518 | COST 528 | LTV 538 | ROI 548 | ... | ENGAGEMENT RATE 558 |
| ... | ... | ... | ... | ... | ... |
| AD CAMPAIGN n | COST n | LTV n | ROI n | ... | ENGAGEMENT RATE n |

SYSTEMS AND METHODS FOR AUTONOMOUS BIDS OF ADVERTISEMENT INVENTORY

FIELD OF THE INVENTION

Embodiments of the invention are generally related to systems and methods for providing programmatic autonomous bids of advertisement inventory.

BACKGROUND

Mobile advertising is a form of advertising via mobile (wireless) phones or other mobile devices. Advertisements (ads) can be presented to the intended user in the form of banner ads, text boxes, and video ads. However, these ads may be difficult to distribute to a targeted user in a timely manner and the user may not be responsive and interested in the ads. Advertisers can create an advertising campaign as a series of advertisement messages that share a single idea and theme. The advertising campaigns appear in different media across a specific time frame. However, advertisers may lack the resources and expertise for effectively creating an ad campaign and delivering the ad campaign to mobile devices.

SUMMARY

Methods and systems are described for providing programmatic autonomous bidding of advertisement inventory. In one embodiment, an advertising system for autonomous bidding of advertisement (ad) inventory includes an ad bidding component or module of an ad server and a storage medium coupled to the ad server. The storage medium stores instructions including instructions of the ad bidding component or module. The advertising system also includes processing logic coupled to the storage medium. The processing logic is configured to execute the instructions to receive a bid campaign function call for an ad campaign from an advertising entity, process the bid campaign function call, determine objectives for the advertising entity including life time value (LTV) for users and return on investment (ROI) for the ad campaign, determine targeted users having characteristics appropriate for satisfying the objectives of the advertising entity, and autonomously determine a first dynamic ad bid price parameter and associated first group of targeted users that satisfy the objectives of the advertising entity based on having characteristics that satisfy at least three different parameters including user spending in a certain category of applications and predicted LTV.

Other embodiments are also described. Other features of embodiments of the present invention will be apparent from the accompanying drawings and from the detailed description which follows.

BRIEF DESCRIPTION OF THE DRAWINGS

The embodiments of the invention are illustrated by way of example and not by way of limitation in the figures of the accompanying drawings in which like references indicate similar elements. It should be noted that references to "an" or "one" embodiment of the invention in this disclosure are not necessarily to the same embodiment, and they mean at least one.

FIG. 5 illustrates an exemplary user interface for programmatic bidding of advertising campaigns in accordance with one embodiment.

DETAILED DESCRIPTION

Figure 1:
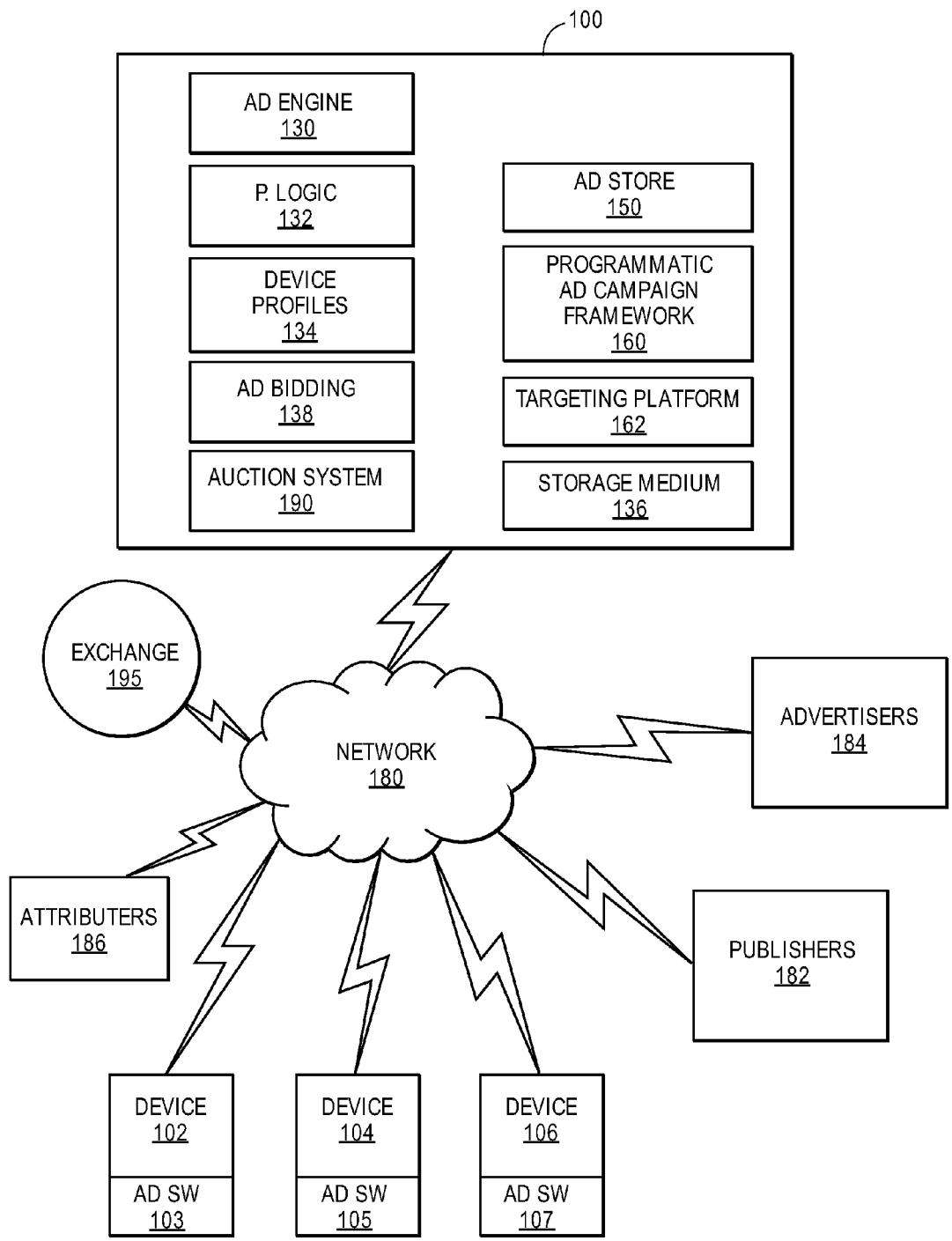
FIG. 1 shows an embodiment of a block diagram of a system 100 for providing programmatic autonomous bids of advertisement inventory in accordance with one embodiment.

Methods and systems are described for providing programmatic autonomous bids of advertisement inventory. In one embodiment, an advertising system for autonomous bidding of advertisement (ad) inventory includes an ad bidding component or module of an ad server and a storage medium coupled to the ad server. The storage medium stores instructions including instructions of the ad bidding component or module. The advertising system also includes processing logic coupled to the storage medium. The processing logic is configured to execute the instructions of the storage medium to receive a bid campaign function call for an ad campaign from an advertising entity, process the bid campaign function call, determine objectives for the advertising entity including life time value (LTV) for users and return on investment (ROI) for the ad campaign, determine targeted users having characteristics appropriate for satisfying the objectives of the advertising entity, and autonomously determine a first dynamic ad bid price parameter and associated first group of targeted users that satisfy the objectives of the advertising entity based on having characteristics that satisfy at least three different parameters including user spending in a certain category of applications and predicted LTV.

In one embodiment, the processing logic is further configured to execute the instructions to determine a second dynamic ad bid price parameter and associated second group of targeted users that satisfy the objectives of the advertising entity based on having characteristics that satisfy at least two of the different parameters.

In one embodiment, the processing logic is further configured to execute the instructions to determine a third dynamic ad bid price parameter and associated third group of targeted users that satisfy the objectives of the advertising entity based on having characteristics that satisfy at least one of the different parameters.

An auction system provides a mechanism for third party participants to bid on providing advertising services including in-application (in-app) advertising services to the device in response to an actual or predictive ad exchange request. The auction system captures demand for providing advertising services in real time or near real time prior to the actual or the predicted ad play event on the device.

In mobile video advertising, high performing campaigns are needed for advertisers, publishers, and users of the publishers. Advertisers include organizations that pay for advertising services including ads on a publisher network of applications and games. Publishers provide content for users. Publishers can include developers of software applications, mobile applications, news content, gaming applications, sports news, etc. The publishers are interested in generating revenue through selling ad space to be on displayed in video ads to their users.

Performance can be defined in terms of click-through rates (CTR), conversion rates, and video completion rates. The process in which a user selects an ad is referred to as a click-through, which is intended to encompass any user selection. The ratio of a number of click-throughs to a number of times an ad is displayed is referred to as the CTR of the ad. A conversion occurs when a user performs a transaction related to a previously viewed ad. For example, a conversion may occur when a user views a video ad and installs an application being promoted in the video ad. A conversion may occur when a user views a video ad and installs an application being promoted in the video ad within a certain time period. A conversion may occur when a user is shown an ad and decides to make a purchase on the advertiser's web site within a certain time period. The ratio of the number of conversions to the number of times an ad is displayed is referred to as the conversion rate. A video completion rate is a ratio of a number of video ads that are displayed to completion to a number of video ads initiated on a device. Advertisers may also pay for their ads through an advertising system in which the advertiser bid on ad placement on a cost-per-click (CPC), cost-per-mille (CPM), cost-per-completed-view (CPCV), cost-per-action (CPA), and/or cost-per-install (CPI) basis. A mille represents a thousand impressions.

In this section several embodiments of this invention are explained with reference to the appended drawings. Whenever the shapes, relative positions and other aspects of the parts described in the embodiments are not clearly defined, the scope of the invention is not limited only to the parts shown, which are meant merely for the purpose of illustration.

FIG. 1 shows an embodiment of a block diagram of a system 100 for providing programmatic autonomous bids of advertisement inventory in accordance with one embodiment. The advertising system 100 includes an advertising engine 130, processing logic 132, device profiles 134, storage medium 136, an auction system 190, an ad store 150, and a programmatic ad campaign framework 160 for providing programmatic creating and modification of ad campaigns (e.g., ad campaigns for delivering in-app video ads to mobile devices, ad campaigns for delivering in-app video ads to any type of device). The auction system 190 may be integrated with the advertising system or separate from the advertising system. The auction system 190 may include different types of auctions including cost-per-install (CPI), cost-per-click (CPC), cost-per-action (CPA), cost-per-mille (CPM), second price auction, and an ad exchange auction. The system 100 provides advertising services for advertisers 184 to devices 102, 104, and 106 (e.g., source device, client device, mobile phone, tablet device, lap top, computer, connected or hybrid television (TV), IPTV, Internet TV, Web TV, smart TV, satellite device, satellite TV, automobile, airplane, etc.). A device profile for a device is based on one or more parameters including location (e.g., GPS coordinates, IP address, cellular triangulation, etc.) of the device, a social profile for a user of the device, and categories or types of applications installed on the device.

A targeting platform 162 includes different parameters for targeting users in ad campaigns and may include one or more performance based algorithms that utilized these different parameters for creating a performance based ad campaign. Alternatively, the performance based algorithms may be included in the ad engine 130 and obtain data from the targeting platform for creating a performance based ad campaign. The parameters include device characteristics (e.g., device id for uniquely identifying a device, make and model of a user's device, network connection for user's device, whether user's device is mobile device or tablet device, OS version, volume, screen size and orientation, language setting, etc.) and user characteristics (e.g., user spend, conversion rate, engagement rate, app type, in-app purchase (IAP) activity, number of past application installs, time of last application install, etc.) from any source including the system 100, attributers 186, advertisers 184, and publishers 182. The conversion rate may be used to divide users into different groups based on a predicted conversion rate. A category conversion rate can indicate how likely a conversion occurs for a user with a particular app category (e.g., sports games, war games, quest games, news content apps, restaurant apps, etc.). An engagement rate indicates how engaged a user is with an ad in terms of cognitive (e.g., awareness, interest), physical (e.g., user-initiated transaction), and emotional factors. In one example, engagement with an ad video is measured in terms of play rate, playthrough rate, completion rates, video viewing time, and share rates. In another example, rich media engagement is measured in terms of display times, expansions, expansion times, interaction time and rate, form responses, game play, and share rates. In another example for mobile devices, engagement includes click to call, retail location, interaction rates, click to download, click to play, and share rates. An engagement rate is used to target users having a high ad engagement during ad play events. An app type may target users having competitor apps installed or users that have a particular "X" app installed. The competitor apps are competitors of publishers or developers that want to advertise to users of the competitor apps. The IAP activity targets users with IAP activity as indicated by user data from the system's 100 data pipeline.

Users with IAP activity can be separated into groups based on spend ranges (e.g., $10-50 range, $50-100 range, $100 or more range, etc.). The device age can be used to target new devices with respect to the system 100. Additional parameters include segments of users such as non-payers versus payers, social influence based on social media data, organic app installs, and life time value (LTV) of a user. The targeting platform is used to support advertisers with complex bid strategies for their user acquisition campaigns.

In one example, closing a video ad at an earliest opportunity can be interpreted as a negative emotion in regards to the video ad. A user's interaction with hardware (e.g., display device, motion device, gyroscope, accelerometer, smart watch, heart rate monitor, blood pressure sensor, etc.) may also be used to infer an emotional state of the user. For example, a user can interact with an interactive end card of an ad campaign by touching numerous touch points on a display device of a device to indicate an emotional state. A user can move the device in a certain shape or pattern that can be detected by a motion device.

Each device includes a respective advertising services software 103, 105, 107 (e.g., a software development kit (SDK)) that includes a set of software development tools for advertising services including in-app advertising services (e.g., advertising services delivered within mobile applications, advertising services delivered within non-web browser applications). In-app ad campaigns are ad campaigns (e.g., video ads) served to devices in-app (e.g., within mobile applications on a mobile device, within non-web browser software applications on a device, etc). The publishers 182 (or developers) publish content along with selling ad space to advertisers. Attributers 186 may install software (e.g., software development kits of publishers) on client devices and track user interactions with publisher and developer applications and advertisements. The attributers can then share this user data and device data with the system 100 and the appropriate publishers and advertisers. The system 100 uses this user and device data for analytics, data science, and return on investment advertising modeling. The system 100, devices 102, 104, 106, advertisers 184, publishers 182, attributers 186, and an ad exchange 195 with third party exchange participants communicate via a network 180 (e.g., Internet, wide area network, WiMax, satellite, cellular, IP network, etc.). The third party exchange participants can bid in real time or approximately in real time (e.g., 1 hour prior to an ad being played on a device, 15 minutes prior to an ad being played on a device, 1 minute prior to an ad being played on a device, 15 seconds prior to an ad being played on a device, less than 15 seconds prior to an ad being played on a device, less than 1 second prior to an ad being played on a device) using the auction system 190 to provide advertising services (e.g., an in-app video ad that includes a preview (e.g., video trailer) of an application, in-app ad campaigns for brand and performance advertisers) for the devices. The processing logic 132 may include a filtering functionality for filtering potential available ad campaigns, an optimizer functionality for determining an optimal ad campaign, and a selector (picker) functionality for selecting an optimal campaign. The filtering functionality may filter ad campaigns based on availability, device characteristics (e.g., device profiles 134, device age, OS type, network connection for user's device, whether user's device is mobile device or tablet device, volume, screen size and orientation, language setting, etc.), and user characteristics (e.g., age, gender, ethnicity, location, etc.), etc.

Advertisers 184 or publishers 182 (or developers) can programmatically access the programmatic ad campaign framework 160 for creating and modifying ad campaigns (e.g., ad campaigns for delivering video ads to mobile devices, ad campaigns for delivering video ads to any type of device) via a network 180. The ad campaign(s) are then delivered from any ad source to the targeted user devices (e.g., 102, 104, 106) via the network 180. The programmatic ad campaign framework 160 includes application programming interfaces (APIs) and implementing components. An API is a set of routines, protocols, and tools for building software applications. The API specifies how software components should interact. The advertisers 184 or publishers 182 (or developers) obtain programmatic ad campaign software from the system 100 and then use this software for accessing the programmatic ad campaign framework 160. The programmatic ad campaign software sends functions calls with parameters to one or more APIs of the programmatic ad campaign framework 160. These APIs communicate with implementing software components of the framework 160. The implementing software components (e.g., software libraries) provide a set of functionalities for creating and modifying ad campaigns. The APIs then send function calls or responses to the programmatic ad campaign software of the advertisers or publishers via network 180. In this manner, the advertisers or publishers can programmatically create and modify ad campaigns using the advertising system 100 which has improved computer functionality in the form of the programmatic ad campaign framework based on directly receiving input from the advertisers or publishers for creating a custom ad campaign.

In contrast, conventional ad campaigns are created with an advertiser or publisher talking with numerous ad sales, ad development, and ad creative staff for the advertising system. The sales, ad development, and ad creative staff must then use different internal tools of the advertising system to create the ad campaign for the advertiser or publisher. The advertiser or publisher then needs to review the created ad campaign and provide feedback for revisions of the ad campaign. The advertising system works in a more efficient and streamlined manner based on the advertisers and publishers being able to directly access the ad tools of the advertising system and create or modify their own custom ad campaigns in a time sensitive manner with minimal delay.

The targeting platform 162 also provides advanced targeting as described herein for improved targeting computer functionality. The targeting platform 162 allows an advertising entity (e.g., advertiser, ad agency, publisher, developer, etc.) to utilize one or more performance based algorithms to more quickly locate and target users based on objectives of the ad campaign such as locating high conversion users and high lifetime value users. The targeting platform 162 can focus on more important parameters (e.g., high conversion users, high lifetime value users) and devalue or ignore other parameters to perform the processing operations in a shorter time period. Ad campaigns for delivering video ads to client devices via a network 180 can be adapted based on the engagement of the user. For example, a user that does not interact with an ad can be sent ads more frequently while a user that does interact with an ad can be sent ads less frequently.

The system 100 also includes an ad bidding module 138 for providing autonomous bidding of ad inventory based on objectives for an ad campaign. For example, an advertiser or publisher may have a life time value (LTV) objective for each user and return on investment objective for the ad campaign. The ad bidding module 138 autonomously determines a price for a certain time or time period for an in-app ad campaign based on these objectives and also based on how well targeted user(s) fulfills those objectives. A targeted user having more desirable targeting characteristics (e.g., large spender greater than spender threshold in a certain application category, large predicted LTV greater than a LTV threshold) may command a larger price for serving an in-app ad campaign to a device of this particular targeted user in comparison to a different user that has a lower predicted LTV or other less desirable targeting characteristics. An advertiser or publisher is willing to pay more money for serving an ad campaign to users having a natural affinity for services or products of the advertiser or publisher. These users will be frequent users of installed applications with desirable LTVs.

High conversion users and high lifetime value users are examples of users having predicted life time values greater than a threshold LTV. High conversion users may convert more than a threshold conversion percentage (e.g., more than 10%, more than 30%, more than 50%, etc.) for an ad campaign. High lifetime value users are predicted to have a LTV greater than a threshold LTV (e.g., greater than $50, greater than $100, etc.) for an ad campaign.

In one embodiment, the system 100 includes a storage medium 136 to store one or more software programs. Processing logic (e.g., 132) is configured to execute instructions of an ad bidding component or module to receive a bid campaign function call for an ad campaign from an advertising entity, process the bid campaign function call, determine objectives for the advertising entity including life time value (LTV) for users and return on investment (ROI) for the ad campaign, determine targeted users having characteristics appropriate for satisfying the objectives of the advertising entity, and autonomously determine a first dynamic ad bid price parameter for a first time or time period and associated first group of targeted users that satisfy the objectives of the advertising entity based on having characteristics that satisfy at least three different parameters. In one example, the first dynamic ad bid price parameter can have a first price for a first user or first group of users in a first location at a first time or first time period. In another example, the first dynamic ad bid price parameter can have a second bid price for the first user or first group of users in a second different location or for a second different time period. In another example, the first dynamic ad bid price parameter can have a third bid price for the first user or first group of users if at least one of the device characteristics (e.g., device age, OS type, network connection for user's device, whether user's device is mobile device or tablet device, volume, screen size and orientation) of the first user or first group of users changes.

In one embodiment, the processing logic is further configured to execute the instructions to determine a second dynamic ad bid price parameter and associated second group of targeted users that satisfy the objectives of the advertising entity based on having characteristics that satisfy at least two of the different parameters. In one example, the second dynamic ad bid price parameter can have a first price for a second user or second group of users in a first location at a first time or first time period. In another example, the second dynamic ad bid price parameter can have a second different bid price for the second user or second group of users in a second different location or for a second different time period. In another example, the second dynamic ad bid price parameter can have a third bid price for the second user or second group of users if at least one of the device characteristics (e.g., device age, OS type, network connection for user's device, whether user's device is mobile device or tablet device, volume, screen size and orientation) of the second user or second group of users changes.

In one embodiment, the processing logic is further configured to execute the instructions to determine a third dynamic ad bid price parameter and associated third group of targeted users that satisfy the objectives of the advertising entity based on having characteristics that satisfy at least one of the different parameters. In one example, the third dynamic ad bid price parameter can have a first price for a third user or third group of users in a first location at a first time or first time period. In another example, the third dynamic ad bid price parameter can have a second bid price for the third user or third group of users in a second different location or for a second different time period. In another example, the third dynamic ad bid price parameter can have a third bid price for the third user or third group of users if at least one of the device characteristics (e.g., device age, OS type, network connection for user's device, whether user's device is mobile device or tablet device, volume, screen size and orientation) of the third user or third group of users changes.

The dynamic ad bid price parameters (e.g., first ad bid price parameter, second ad bid price parameter, third ad bid price parameter, etc.) change dynamically based on time periods, locations, user characteristics, and device characteristics.

Figure 2:
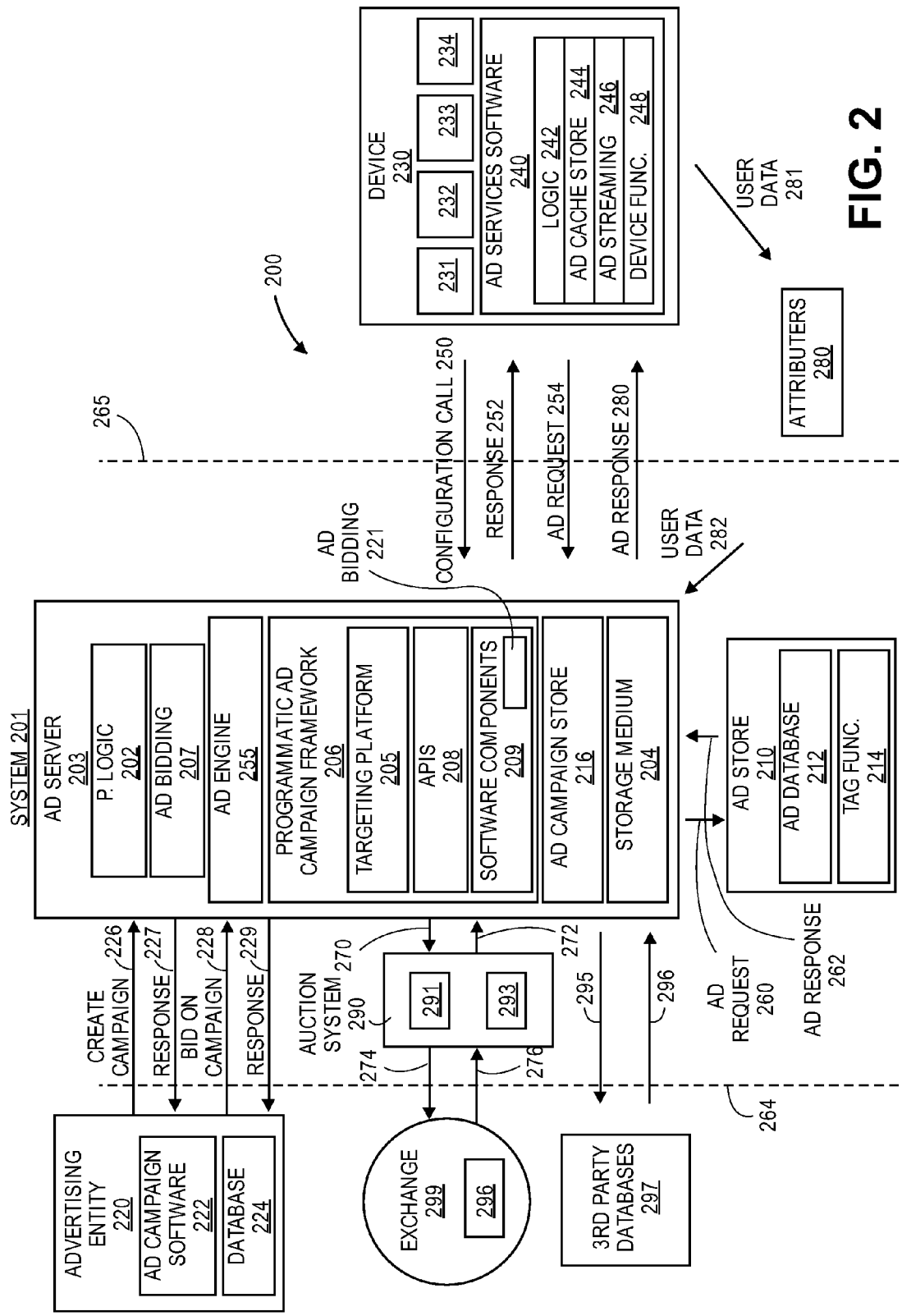
FIG. 2 illustrates a flow diagram of operations for providing programmatic autonomous bids of advertisement inventory in accordance with one embodiment.

FIG. 2 illustrates a flow diagram of operations for providing programmatic autonomous bids of advertisement inventory in accordance with one embodiment. The advertising operational flow of an advertising system may be executed by an apparatus or system, which includes processing circuitry or processing logic. The processing logic may include hardware (circuitry, dedicated logic, etc.), software (such as is run on a general purpose computer system or a dedicated machine or a device), or a combination of both. In one embodiment, an advertising system performs the operations of method 200. In one example, the vertical dashed lines 264 and 265 represent a separation of the components of the system 201 (e.g., ad server 203, auction system 290, ad store 210) and components external to the system 201 (e.g., device 230, attributers 280, exchange 299, third party databases 297, advertising entity 220). The components of the system 201 communicate with the components external to the system via a network (e.g., network 180).

An advertising entity (e.g., advertiser, ad agency, publisher, developer, etc.) 220 uses ad campaign software 222 for creating, modifying, and bidding on advertising campaigns (e.g., ad campaigns for delivering video ads to mobile devices, ad campaigns for delivering in-app video ads to any type of device (e.g., source device, client device, mobile phone, tablet device, lap top, computer, connected or hybrid television (TV), IPTV, Internet TV, Web TV, smart TV, etc.). The ad campaign software 222 sends a function call 230 (e.g., create campaign function call) to the system 201 at operation 230. The function call includes different parameters including an identification for identifying the advertising entity and an identification for identifying an ad campaign to be created. One or more APIs 208 of the programmatic ad campaign framework 206 receives the function call from the ad campaign software 222. Parameters of the function call and data control information are transferred to software components 209, which respond by providing a set of functionality for creating an ad campaign. A response is sent from the one or more APIs to the ad campaign software 222 at operation 227. The response includes one or more function calls with return values and parameters in response to the function call received from the ad campaign software. The parameters of the response may include an identification of the ad campaign (e.g., ad campaign 1), and features or functions of the ad campaign. The ad campaign software 222 will display a user interface or dashboard for customizing the ad campaign. The created ad campaign can be saved in the database 224 and also in the ad campaign store 216. The ad campaign may utilize ads from any source including database 224, an ad store 210, third party databases 297, etc. The ad campaign framework 207 includes inversion of control such that an overall program flow is dictated by the framework not the caller (e.g., advertising entity). The framework also includes default behavior and can be extended by a user to provide specific functionality. The framework includes non-modifiable framework code that is not to be modified but does allow user-implemented extensions.

The ad campaign software 222 can also update an ad campaign by sending a function call (e.g., update campaign function call) to the system 201. One or more APIs 208 of the programmatic ad campaign framework 206 receives the function call from the ad campaign software 222. Parameters of the function call and data control information are transferred to the software components 209, which respond by providing a set of functionality for updating the ad campaign. A response is sent from the one or more APIs to the ad campaign software 222. The response includes one or more function calls with return values and parameters in response to the function call received from the ad campaign software. The parameters of the response may include an identification of the ad campaign (e.g., ad campaign 1.1), and features or functions of the ad campaign.

The ad campaign software 222 can also bid on an ad campaign by sending a function call (e.g., bid campaign function call) to the system 201. One or more APIs 208 of the programmatic ad campaign framework 206 receives the function call from the ad campaign software 222. Parameters of the function call and data control information are transferred to the software components 209, which may include an ad bidding component 221 that responds by providing a set of functionality for programmatically determining a price for serving the ad campaign to a specific user or group of users having similar characteristics. In another embodiment, the bid campaign functional call is received and processed by an ad bidding module 207 which responds by providing a set of functionality for programmatically determining a dynamic ad bid price parameter for serving the ad campaign to a specific user or group of users having similar characteristics. The ad bidding component 221 (or ad bidding module 207) then determines objectives for an advertising entity such as LTV and return on investment. These objectives and other relevant parameters such as a dynamic bid price parameter, which must be greater than a minimum bid price, and type of campaign (e.g., CPI, CPA, CPCV, CPA, etc.) may be extracted from the bid on campaign function call 228 or from the creation of the ad campaign by the advertising entity. The ad bidding component 221 (or ad bidding module 207) then communicates with a targeting platform 205 to determine targeted users having characteristics appropriate for satisfying the objectives of the advertising entity.

The targeting platform 205 may be integrated with the programmatic ad campaign framework 206 or separate from the programmatic ad campaign framework 206. The targeting platform includes different parameters for targeting users in ad campaigns and may include one or more performance based algorithms that utilize these different parameters for creating an ad campaign. Alternatively, the performance based algorithms may be located in the ad engine 255. For example, the ad campaign framework 206 may access first party data, third party data (e.g., from attributers), parameters, and algorithms from the targeting platform or ad engine for locating targeted users having characteristics appropriate for satisfying the objectives of the advertising entity.

The parameters include device characteristics (e.g., make and model of a user's device, network connection for user's device, whether user's device is mobile device or tablet device, OS version, volume, screen size and orientation, language setting) and user characteristics (e.g., user spend, conversion rate, engagement rate, app type, in-app purchase (IAP) activity, number of past application installs, time of last application install, etc.) from any source including the system 100, attributers 186, advertisers 184, and publishers 182. Additional parameters include segments of users such as non-payers versus payers, social influence based on social media data, organic app installs, and predicted life time value (LTV) of a user.

In one embodiment, the advertising system determines a group of users that satisfy the objectives of the advertising entity. In one example, the targeting platform locates users based on different parameters including user spending in a certain category of applications, a user engagement rate indicating how frequently a user watches an ad, previous application installs, device volume, predicted LTV, and affinity in the certain category of applications. A first group of users that satisfy desired characteristics (e.g., high spender is preferred to low spender, high device volume is preferred to low device volume) for all or most of these parameters (e.g., high spender, high engagement rate, numerous app installs, high predicted LTV, strong affinity for the certain category of applications) will be bid on by the advertising system. For example, a higher dynamic bid price parameter (e.g., $25-35 per software application install) may be autonomously determined by the advertising system (e.g., ad bidding component 221, or ad bidding module 207) for the first group of users. A publisher may set a maximum bid price (e.g., $35/install for CPI campaign, $5/action for CPA campaign) and the higher dynamic bid price parameter and all other dynamic bid price parameters will need to be equal to or less than the maximum bid price.

Processing logic of the advertising system is configured to execute instructions to determine a first dynamic ad bid price parameter and associated first group of targeted users that satisfy the objectives of the advertising entity at a first time period based on having characteristics that satisfy at least three different parameters including user spending in a certain category of applications and predicted LTV.

In one embodiment, the processing logic is further configured to execute the instructions to determine a second dynamic ad bid price parameter and associated second group of targeted users that satisfy the objectives of the advertising entity at a second time period based on having characteristics that satisfy at least two of the different parameters.

In one embodiment, the processing logic is further configured to execute the instructions to determine a third dynamic ad bid price parameter and associated third group of targeted users that satisfy the objectives of the advertising entity at a third time period based on having characteristics that satisfy at least one of the different parameters.

In one example, the second group of users which satisfy desired characteristics for some by not all of these parameters will be bid on by the advertising system. For example, a lower dynamic bid price parameter (e.g., $15-25 per install) may be autonomously determined by the advertising system (e.g., ad bidding component 221, or ad bidding module 207) for the second group of users for a first time period. A different dynamic bid price parameter (e.g., $10-20 per install) may be autonomously determined by the advertising system (e.g., ad bidding component 221, or ad bidding module 207) for the second group of users for a different second time period.

The third group of users that satisfy desired characteristics for one or two of these parameters may also be bid on by the advertising system. For example, a lower dynamic bid price parameter (e.g., $5-15 per install) may be autonomously determined by the advertising system (e.g., ad bidding component 221, or ad bidding module 207) for the third group of users for a first time period. A lower dynamic bid price parameter (e.g., $5-10 per install) may be autonomously determined by the advertising system (e.g., ad bidding component 221, or ad bidding module 207) for the third group of users for a different second time period.

A response 229 is sent from the advertising system (e.g., one or more APIs to the ad campaign software 222, ad bidding component 221221, ad bidding module 207) to the advertising entity. The response includes one or more function calls with return values and parameters in response to the function call received from the ad campaign software. The parameters of the response may include an identification of the ad campaign (e.g., ad campaign 1.1), and features or functions of the ad campaign including a bid price(s) for at least one group of users for delivering the ad campaign to this at least one group of users. In one example, the response includes a bid price parameter for each group of users for delivering the ad campaign to each group of users.

In one embodiment, the advertising entity will then have the option of accepting or rejecting the dynamic bid price parameter(s) for delivering the ad campaign to at least one targeted group of users. If accepted, the advertising system will then deliver the ad campaign to the at least one targeting group of users.

In another embodiment, the advertising entity is not given the option to accept or reject the dynamic bid price parameter determined programmatically. Rather, the advertising entity has already agreed to the terms of the programmatically determined bid(s). The advertising system will then deliver the ad campaign to the at least one targeting group of users.

A device 230 (e.g., source device, client device, mobile phone, tablet device, lap top, computer, connected or hybrid television (TV), IPTV, Internet TV, Web TV, smart TV, etc) initiates a software application (e.g., at least one of software applications 231-234). For example, a user may select one of the software applications. The advertising services software 240 is also initiated upon the initiation of one of the software applications. The advertising services software 240 may be associated with or embedded with the software applications. The advertising services software 240 may include or be associated with logic 242 (e.g., communication logic for communications such as an ad request), an ad cache store 244 for storing one or more ads or ad campaigns, ad streaming functionality 246 for receiving, optionally storing, and playing streamed ads, and device functionality 248 for determining device and connection capabilities (e.g., type of connection (e.g., 4G LTE, 3G, WiFi, WiMax, 5G, etc.), bandwidth of connection, location of device, type of device, display characteristics (e.g., pixel density, color depth), etc.). The initiated software application or advertising services software may have an ad play event for displaying or playing an ad on the display of the device. At operation 250, processing logic 202 of an ad server 204 of system 201 receives a configuration call from the device 230 upon the initiation of the software application and associated advertising services software 240. At operation 252, the processing logic 202 sends a response that includes at least one configuration file to the device 230 in response to the configuration call. The at least one configuration file includes different options for obtaining an ad to play for the ad play event. In one embodiment, a first option includes playing at least one ad that is cached on the device 230 during the ad play event. A second option includes planning to play at least one ad that is cached on the device 230 but asking for at least one better ad from the system 201. If the system 201 obtains and delivers at least one better in-app ad in a timely manner (e.g., in time for a predicted ad play event, within a time period set by the at least one configuration file) then the at least one better ad will play during the predicted ad play event. The at least one better ad is expected to have a higher conversion rate or higher likelihood of obtaining a user interaction than the at least one cached ad. The cached ad or the at least one better ad may be an ad campaign having a dynamic bid price parameter determined programmatically by the advertising system and delivered to a targeted user or group of users as discussed herein. Otherwise, the cached ad is played. A third option includes planning to play at least one ad that is cached on the device 230 but asking for at least one better ad from the exchange 299. If the exchange 299 including third party databases 296 provides at least one better ad in a timely manner then the better ad will play during the ad play event. Otherwise, the cached ad is played. A fourth option includes planning to play at least one ad that is cached on the device 230 but asking for at least one better ad from the system 201 or the exchange 299. If the system 201 or the exchange 299 provide at least one better ad in a timely manner then the better ad will play during the ad play event. Otherwise, the cached ad is played.

A fifth option includes streaming at least one ad to be played during the predicted ad play event to the device 230. A sixth option includes planning to play at least one ad that is streamed to the device 230 but asking for at least one better ad from the system 201. If the system 201 provides the at least one better ad in a timely manner (e.g., in time for the ad play event, within a time period set by the configuration file) then the better ad will play during the ad play event. Otherwise, the planned streamed ad is played. A seventh option includes planning to play at least one ad that is streamed to the device 230 but asking for at least one better ad from the exchange 299. If the exchange 299 provides a better ad in a timely manner then the better ad will play during the ad play event. Otherwise, the planned streamed ad is played. An eighth option includes planning to play at least one ad that is streamed to the device 230 but asking for at least one better ad from the system 201 or the exchange 299. If the system 201 or the exchange 299 provide a better ad in a timely manner then the better ad will play during the predicted ad play event. Otherwise, the planned streamed ad is played. In others embodiments, the configuration file includes a subset of the options 1-8, additional options for obtaining at least one ad or ad campaign, or different options (e.g., options that include potential caching and streaming operations).

The configuration file can be altered by the system 201 or the device 230 without affected the advertising services software 240. In particular, the configuration file can be altered without affecting a version of the advertising services software 240 such that a user does not need to update a version of the advertising services software even if the configuration file changes. The system 201 is designed to deliver the most relevant and highest converting ads to devices using the configuration file.

At operation 254, prior to a predicted ad play event or an actual ad play event, the processing logic of the ad server optionally receives an ad request with a configurable option (e.g., options 1-8) of the at least one configuration file based on an anticipated ad play event occurring in the near future (e.g., 1 hr, 15 minutes, 60 seconds, 10 seconds, etc.). The ad request may be a predictive ad request if it occurs prior to a predicted ad play event. Alternatively, the ad server generates an ad request based on receiving the configuration call, which indicates that the user has initiated a software application and an anticipated ad play event will likely occurring in the near future even though no ad request is received from the device.

The ad request includes different types of information including publisher settings (e.g., a publisher of the selected software application), an application id to identify the selected software application, placement information for timing placement of an ad in-app (e.g., within mobile applications on a mobile device, within non-web browser software applications on a device, etc), user characteristics, device characteristics (e.g., device id, make and model of a user's device, network connection for user's device, whether user's device is mobile device or tablet device, OS version, volume, screen size and orientation, language setting, etc.), geographical data, location data, motion data (e.g., motion data from an accelerometer or gyroscope), language, time, application settings, demographic data for the user of the device, session data (e.g., how long a user has been using the selected application), and cache information. The ad server processes the ad request to determine an ad format and timing placement (e.g., an optimal ad format in terms of likelihood of converting, an optimal timing placement in terms of likelihood of converting) of at least one ad or interstitial ad played in-app within an initiated software application (e.g., any type of software application, non-web browser software applications) based on the information contained in the predictive ad request. The advertising system determines an ad format and timing placement that is most likely to convert or generate revenue for a publisher or a developer.

Attributers 280 may have software (e.g., a SDK of the publisher of the application) installed on the user's device in order to obtain third party user data (e.g., user data 281 from the device 230). This user data may include tracking of a user's interaction and engagement with the software application, a length of time that the application is installed, an amount of purchases from the application, and buying patterns in terms of which products or services are purchased and when these products or services are purchased. The user data may also include monitoring target goals for how the user engages with the application. The user data (e.g., user data 282) can be shared with system 201, publishers, and advertisers via a network.

The ad server also processes the ad request (or predictive ad request) and accesses at least one of the ad store 210 and the exchange 299 for options 2-8 of the at least one configuration file to obtain at least one ad or ad campaign that is likely or most likely to convert. The ad server may determine which option of options 1-8 will be processed or enabled for processing the ad request (or predictive ad request) based on one or more configurable parameters. Alternatively, the device or user may determine which option of options 1-8 will be processed or enabled based on these parameters.

For option 1, the device plays at least one ad from cache. For options that access the ad store 210, at operation 260, the processing logic 202 sends an ad call or request (or a predictive ad call or request) to the ad store 210 of the system 201. The ad store includes an ad database 212 having ad campaigns and ads. The ad database 212 may be a first party ad database, i.e., a database of system 201. The ad store may optionally provide access to third party ad databases 297 via tag functionality 214. The tag functionality 214 generates or stores an ad serving tag for accessing one or more third party ad databases 297. The ad campaigns and ads are capable of being streamed to ad streaming 246 of the device or saved in an ad cache store 240 of the device.

At operation 262, the ad server receives an ad response from the ad store 210 in response to the ad call or request (or predictive ad call or request). The ad response includes a payload with one or more potential ads or ads campaigns for being streamed to the device 230 or optionally an ad serving tag for accessing one or more third party ad databases 297. If the ad server receives an ad serving tag, then the ad server sends an ad request (or predictive ad request) to the third party database at operation 295 and receives an ad response (or predictive ad response) at operation 296 from the third party database 297. The ad response from the ad store or the third party databases 297 includes one or more ads or ad campaigns for being sent or streamed to the device 230. The processing logic 202 decides whether to stream at least one ad or ad campaign to the device 230 based on the determined or selected option of the at least one configurable file.

The ad server upon processing an ad request (or a predictive ad request) may access the exchange 299 given certain options (e.g., options 3, 4, 7, and 8) of the at least one configuration file. In this case, the ad server sends an exchange request (or a predictive exchange request 270) to the auction system 290 having an auction engine 291 and database 293 prior to a predicted ad play event or actual ad play event on the device. Alternatively, the auction system is integrated with the advertising system 201. The auction engine 291 processes the ad exchange request 270 and generates an auction based on different business rules including at least one of a price (e.g., a floor or lowest price for the ad or ad campaign), inventory allocation, and participants who can participate in the auction.

In one embodiment, the auction is a second price auction in which each participant gives their highest price (e.g., $10 per app install) and the highest bidder pays the price of the second highest bidder (e.g., $8 per app install). The advantage of this monetization model is that advertisers only bid the maximum that they are willing to pay for a set of conditions. In the scenario where another bidder's maximum price is significantly lower, the highest bidder only gets charged the second highest price of the auction. This encourages advertisers to bid actual or real market value for inventory while giving advertisers a chance to spend significantly less.

The auction determines which participant can provide a better ad for the device in a timely manner. At operation 274, the auction system 290 sends an ad exchange request (or a predictive ad exchange request to each participant of the auction). The ad exchange request (or predictive ad exchange request) includes configurable parameters including at least one of ad length, bit rate for playing the ad, ad categories, age ratings, a limit for a number of redirects to minimize latency, and the floor price. The configurable parameters are designed to enhance a user experience (e.g., by minimizing latency) and provide safety for the user based on the age rating. One or more participants then respond with an ad exchange response (or a predictive ad exchange response) at operation 276. The auction engine processes the ad exchange responses (or predictive ad exchange responses) (bids) and determines which participant(s) if any will serve a better ad for playing on the device for an actual ad play event (or a predicted ad play event). The responses and ads from the participants can be saved in the database 293. At operation 272, an ad response (or a predictive ad response) is sent from the auction engine to the ad server. The ad server then processes the ad from a winning or selected participant as determined by the auction system. In this case, the ad server unpacks the payload of the ad and converts a format of the ad (if necessary) into a standard format (e.g., xml standard, digital video ad serving template (VAST)) for ads served by the ad server. The ad server can compare a better ad from the winning or selected participant from the exchange or possibly any of the bids from the exchange with a cached ad on the device and a better ad obtained with an ad response from the ad store. At operation 280, the ad server can then select at least one better ad from the ad store, a participant with a winning or selected bid from the exchange, a cached ad on the device, or optionally a third party database 297 that has not participated in the exchange. A better ad is anticipated to be more likely to convert or have a higher likelihood of obtaining a user interaction or user engagement than the cached ad on the device. The at least one better ad if selected is then cached on the device or streamed to the device and played during the actual ad play event or a predicted ad play event that has been predicted to occur.

Figure 3:
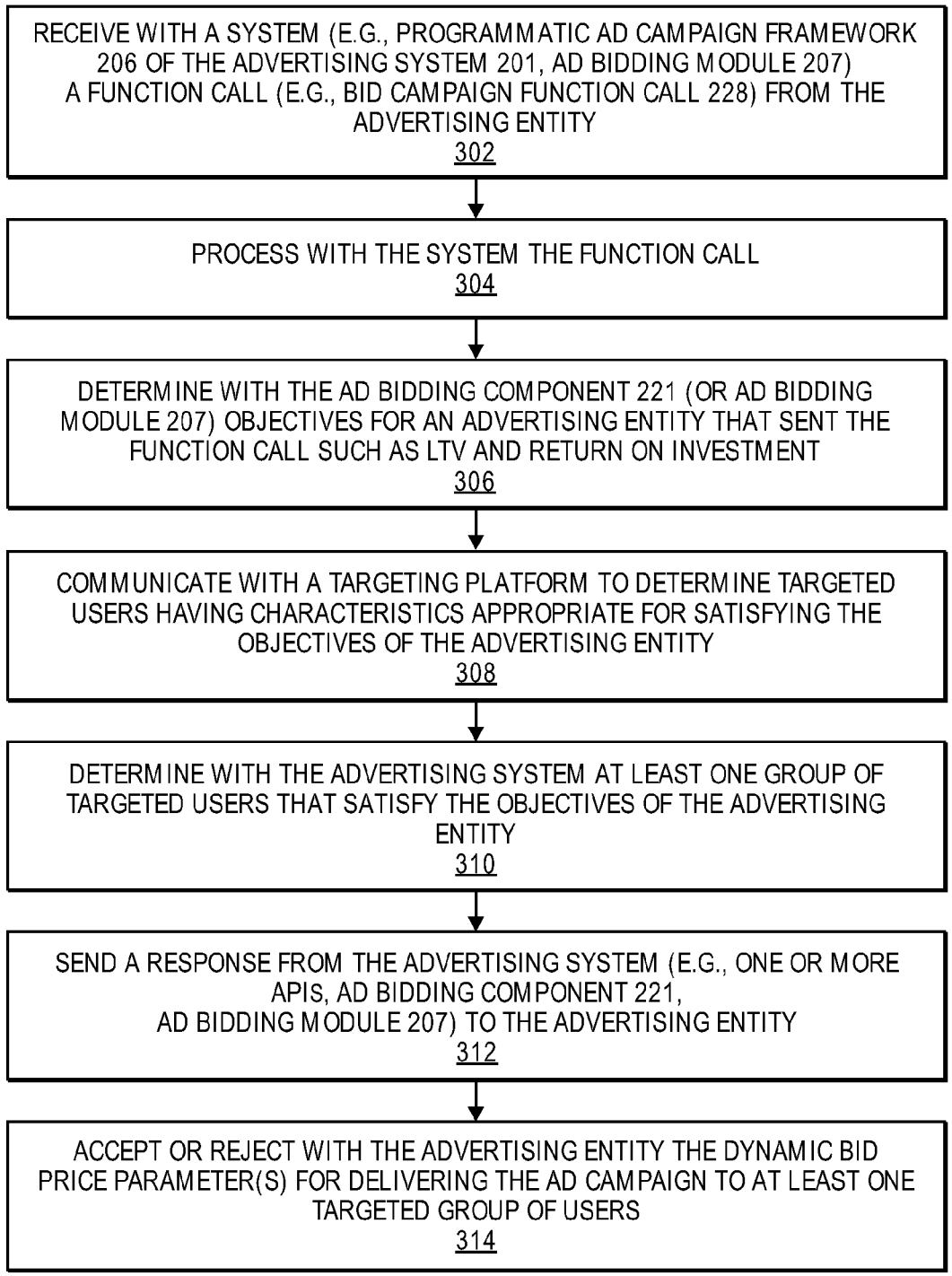
FIG. 3 illustrates flow diagrams of operations of an advertising system for providing programmatic autonomous bids of advertisement inventory in accordance with one embodiment.

FIG. 3 illustrates a flow diagram of operations for an advertising system for providing programmatic bidding of advertising campaigns in accordance with one embodiment. The advertising operational flow of the advertising system may be executed by an apparatus or system, which includes processing circuitry or processing logic. The processing logic may include hardware (circuitry, dedicated logic, etc.), software (such as is run on a general purpose computer system or a dedicated machine or a device), or a combination of both. In one embodiment, a system performs the operations of method 300 by executing instructions of a programmatic ad campaign framework, ad bidding component 221221, or ad bidding module 207. The advertising system communicates with an advertising entity, a device, attributers, an exchange, and a third party database via a network (e.g., network 180).

An advertising entity (e.g., advertiser, ad agency, publisher, developer, etc.) 220 uses ad campaign software 222 to access the programmatic ad campaign framework or ad bidding module for bidding on advertising campaigns (e.g., ad campaigns for delivering video ads to mobile devices, ad campaigns for delivering video ads to any type of device). A system (e.g., programmatic ad campaign framework 206 of the advertising system 201, ad bidding module 207) receives a function call (e.g., bid campaign function call 228) from the advertising entity at operation 302. The advertising entity may be using ad campaign software 222. The ad campaign software 222 can bid on an ad campaign by sending a function call (e.g., bid campaign function call) to the system 201. At operation 304, the system processes the function call. For example, one or more APIs 208 of the programmatic ad campaign framework 206 may receive the function call from the ad campaign software 222. Parameters of the function call and data control information are transferred to the software components 209, which may include an ad bidding component 221 that responds by providing a set of functionality for programmatically determining a price for serving the ad campaign to a specific user or group of users having similar characteristics. In another embodiment, the bid campaign functional call is received and processed by an ad bidding module 207 which responds by providing a set of functionality for programmatically determining a price for serving the ad campaign to a specific user or group of users having similar characteristics. At operation 306, the ad bidding component 221 (or ad bidding module 207) determines objectives for an advertising entity that sent the function call such as LTV and return on investment. These objectives and other relevant parameters such as a dynamic bid price parameter, which must be greater than a minimum bid price if a minimum bid price exists, and type of ad campaign may be extracted from the bid on campaign function call 228 or from creation of the ad campaign by the advertising entity. At operation 308, the ad bidding component 221 (or ad bidding module 207) then communicates with a targeting platform to determine targeted users having characteristics appropriate for satisfying the objectives of the advertising entity.

The targeting platform includes different parameters for targeting users in ad campaigns. For example, the ad campaign framework 206 may access first party data, third party data (e.g., from attributers, from third party advertisers), parameters, and algorithms from the targeting platform or ad engine for locating targeted users having characteristics appropriate for satisfying the objectives of the advertising entity.

The parameters include device characteristics (e.g., make and model of a user's device, network connection for user's device, whether user's device is mobile device or tablet device, OS version, volume, screen size and orientation, language setting) and user characteristics (e.g., user spend, conversion rate, engagement rate, app type, in-app purchase (IAP) activity, number of past application installs, time of last application install, etc.) from any source including the system 100, attributers 186, advertisers 184, and publishers 182. Additional parameters include segments of users such as non-payers versus payers, social influence based on social media data, organic app installs, and predicted life time value (LTV) of a user.

In one embodiment, at operation 310, the advertising system determines at least one of group of targeted users that satisfy the objectives of the advertising entity. In one example, the targeting platform locates users based on different parameters including user spending in a certain category of applications, a user engagement rate indicating how frequently a user watches an ad, app installs, device volume, predicted LTV, and affinity in the certain category of applications. A first group of users that satisfy desired characteristics (e.g., high spender is preferred to low spender, high device volume is preferred to low device volume) for all or most of these parameters (e.g., high spender, high engagement rate, numerous app installs, high predicted LTV, strong affinity for the certain category of applications) will be bid on by the advertising system. For example, a higher dynamic bid price parameter (e.g., $25-35 per software application install) may be autonomously determined by the advertising system (e.g., ad bidding component 221, or ad bidding module 207) for the first group of users. A publisher may set a maximum bid price (e.g., $35/install for CPI campaign, $5/action for CPA campaign) and the higher dynamic bid price parameter and all other dynamic bid price parameter will need to be equal to or less than the maximum bid price.

In another example, a second group of users that satisfy desired characteristics for some by not all of these parameters will be bid on by the advertising system. For example, a lower dynamic bid price parameter (e.g., $15-25 per install) may be autonomously determined by the advertising system (e.g., ad bidding component 221, or ad bidding module 207) for the second group of users. A third group of users that satisfy desired characteristics for one or two of these parameters may also be bid on by the advertising system. For example, a lower dynamic bid price parameter (e.g., $5-15 per install) may be autonomously determined by the advertising system (e.g., ad bidding component 221, or ad bidding module 207) for the third group of users.

At operation 312, a response 229 is sent from the advertising system (e.g., one or more APIs to the ad campaign software 222, ad bidding component 221, ad bidding module 207) to the advertising entity. The response includes one or more function calls with return values and parameters in response to the function call received from the ad campaign software. The parameters of the response may include an identification of the ad campaign (e.g., ad campaign 1.1), and features or functions of the ad campaign including dynamic bid price parameter(s) for at least one group of users for delivering the ad campaign to this at least one group of users. In one example, the response includes a dynamic bid price parameter for each group of users for delivering the ad campaign to each group of users.

In one embodiment, at optional operation 314, the advertising entity will then have the option of accepting or rejecting the dynamic bid price parameter(s) for delivering the ad campaign (e.g., in-app ad campaign) to at least one targeted group of users. If accepted, the advertising system will then deliver the ad campaign to the at least one targeted group of users.

In another embodiment, the advertising entity is not given the option to accept or reject the dynamic bid price parameter determined programmatically. Rather, the advertising entity has already agreed to the terms of the programmatically determined bid(s). The advertising system will then deliver the in-app ad campaign to the at least one targeting group of users.

Figure 4:
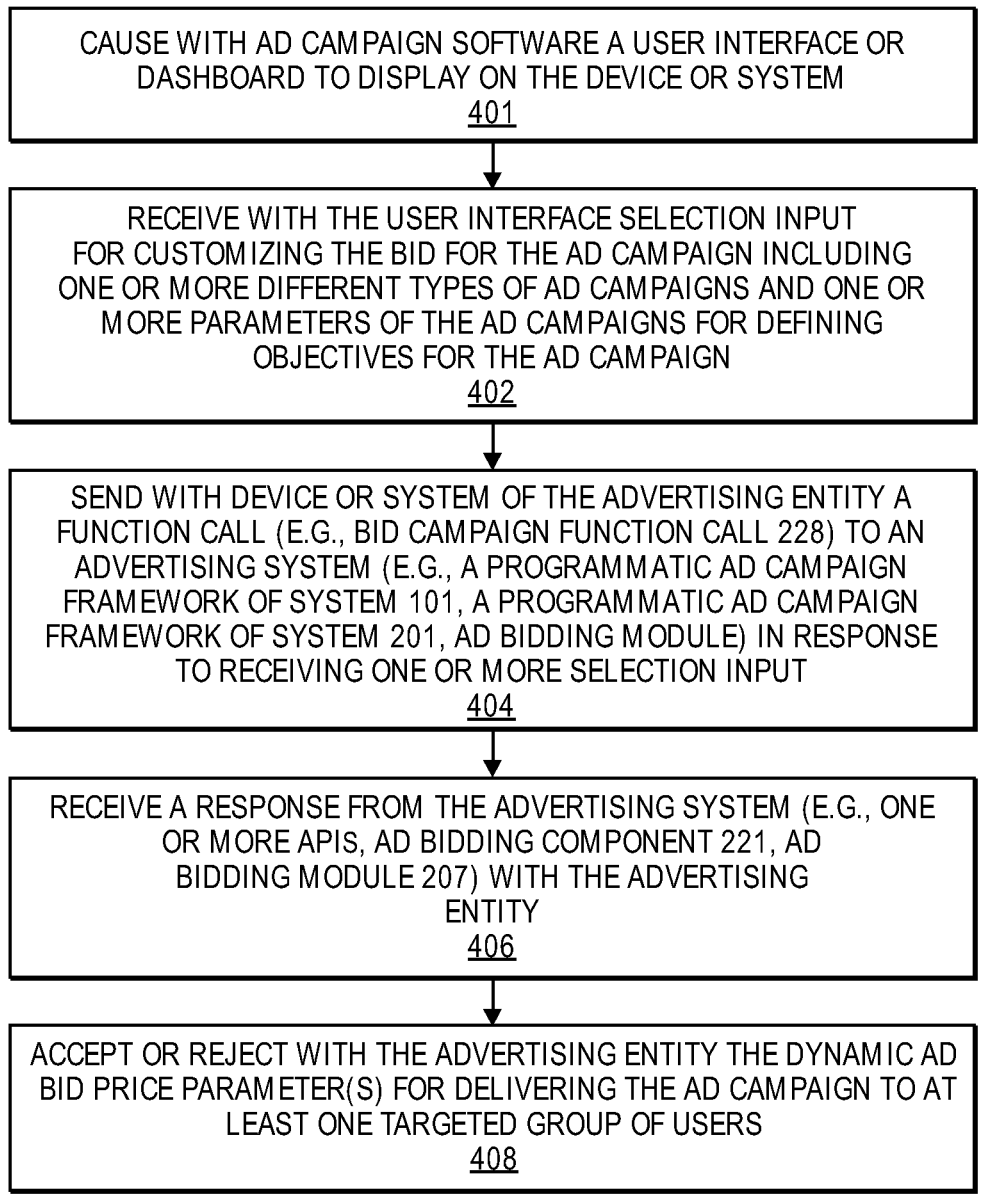
FIG. 4 illustrates a flow diagram of operations for a method of providing programmatic bidding of advertising campaigns in accordance with one embodiment.

FIG. 4 illustrates a flow diagram of operations for a method of providing programmatic bidding of advertising campaigns in accordance with one embodiment. The advertising operational flow of an advertising system may be executed by an apparatus or system, which includes processing circuitry or processing logic. The processing logic may include hardware (circuitry, dedicated logic, etc.), software (such as is run on a general purpose computer system or a dedicated machine or a device), or a combination of both. In one embodiment, a device or system of an advertising entity executes instructions of an ad campaign software to perform at least some of the operations of method 400. The advertising system communicates with an advertising entity, a device, attributers, an exchange, and a third party database via a network (e.g., network 180).

In one embodiment, an advertising entity uses ad campaign software (e.g., ad campaign software 222) installed on a device or a system for programmatically bidding on advertising campaigns (e.g., ad campaigns for delivering in-app video ads to mobile devices, ad campaigns for delivering in-app video ads to any type of device). The ad campaign software causes a user interface or dashboard to display on the device or system at operation 401. At operation 402, the user interface receives selection input for customizing the bid for the ad campaign including one or more different types of ad campaigns and one more parameters of the ad campaigns for defining objectives for the ad campaign. For example, a user of the ad campaign software of the advertising entity selects one or more options for bidding on the ad campaign. The user can select an option to create a new ad campaign or the user can select an existing ad campaign possibly from a list or arrangement of existing ad campaigns to be used as a template for creating a customized ad campaign with defined objectives such LTV and return on investment objectives.

The device or system of the advertising entity sends a function call (e.g., bid campaign function call 230) to an advertising system (e.g., a programmatic ad campaign framework of system 101, a programmatic ad campaign framework of system 201, ad bidding module) at operation 404 in response to receiving one or more selection input. The advertising entity may be using ad campaign software 222. The function call includes different parameters including an identification for identifying the advertising entity, an identification for identifying an ad campaign for bidding on this campaign, a type of ad campaign (e.g., CPI, CPA, CPCV, etc.) and one more parameters of the ad campaign for defining objectives for the ad campaign.

One or more APIs of a programmatic ad campaign framework (or bidding module) of the advertising system receives the function call. Parameters of the function call and data control information are transferred to one or more software components of the programmatic ad campaign framework. The one or more software components respond by providing a set of functionality for programmatic bidding of the ad campaign.

The one or more software components (e.g., ad bidding component 221) or ad bidding module 207 determines objectives for an advertising entity that sent the function call such as LTV and return on investment. These objectives and other relevant parameters such as a dynamic bid price parameter, which must be greater than a minimum bid price if a minimum bid price exists, may be extracted from the bid on campaign function call 228 or from creation of the ad campaign by the advertising entity. The ad bidding component 221 (or ad bidding module 207) then communicates with a targeting platform of the advertising system to determine targeted users having characteristics appropriate for satisfying the objectives of the advertising entity.

The targeting platform includes different parameters for targeting users in ad campaigns. For example, the ad campaign framework 206 may access first party data, third party data (e.g., from attributers, from third party advertisers, publishers), parameters, and algorithms from the targeting platform or ad engine for locating targeted users having characteristics appropriate for satisfying the objectives of the advertising entity.

The parameters include device characteristics (e.g., make and model of a user's device, network connection for user's device, whether user's device is mobile device or tablet device, OS version, volume, screen size and orientation, language setting) and user characteristics (e.g., user spend, conversion rate, engagement rate, app type, in-app purchase (IAP) activity, number of past application installs, time of last application install, etc.) from any source including the system 100, attributers 186, advertisers 184, and publishers 182. Additional parameters include segments of users such as non-payers versus payers, social influence based on social media data, organic app installs, and predicted life time value (LTV) of a user.

In one embodiment, the advertising system determines at least one group of targeted users that satisfy the objectives of the advertising entity. In one example, the targeting platform locates users based on different parameters including user spending in a certain category of applications, a user engagement rate indicating how frequently a user watches an ad, app installs, device volume, predicted LTV, and affinity in the certain category of applications. A first group of users that satisfy desired characteristics (e.g., high spender that spends more than a spend threshold, high device volume that is greater than threshold volume) for all or most of these parameters (e.g., high spender, high engagement rate, numerous app installs, high predicted LTV, strong affinity for the certain category of applications) will be bid on by the advertising system. For example, a higher dynamic bid price parameter (e.g., $25-35 per software application install) may be autonomously determined by the advertising system (e.g., ad bidding component 221, or ad bidding module 207) for the first group of users. A publisher may set a maximum bid price (e.g., $35/install for CPI performance based campaign, $5/action for CPA non-performance based campaign) and the higher dynamic bid price parameter and all other dynamic bid price parameters will need to be equal to or less than the maximum bid price.

In another example, a second group of users that satisfy desired characteristics for some by not all of these parameters will be bid on by the advertising system. For example, a lower bid price (e.g., $15-25 per install) may be autonomously determined by the advertising system (e.g., ad bidding component 221, or ad bidding module 207) for the second group of users. A third group of users that satisfy desired characteristics for one or two of these parameters may also be bid on by the advertising system. For example, a lower bid price (e.g., $5-15 per install) may be autonomously determined by the advertising system (e.g., ad bidding component 221, or ad bidding module 207) for the third group of users.

In another example, the system generates a group of users having a LTV of $50 or more and then programmatically determines a dynamic bid price parameter for this group of users.

At operation 406, a response is received from the advertising system (e.g., one or more APIs to the ad campaign software 222, ad bidding component 221, ad bidding module 207) to the advertising entity. The response includes one or more function calls with return values and parameters in response to the function call received from the ad campaign software. The parameters of the response may include an identification of the ad campaign (e.g., ad campaign 1.1), and features or functions of the ad campaign including a bid price(s) for at least one group of users for delivering the ad campaign to this at least one group of users. In one example, the response includes a dynamic bid price parameter for each group of users for delivering the ad campaign to each group of users.

In one embodiment, at optional operation 408, the advertising entity will then have the option of accepting or rejecting the dynamic bid price parameter(s) for delivering the ad campaign to at least one targeted group of users. If accepted, the advertising system will then deliver the ad campaign to the at least one targeting group of users.

FIG. 5 illustrates an exemplary user interface for programmatic bidding of advertising campaigns in accordance with one embodiment. The user interface 500 occurs after an advertiser entity (e.g., advertiser, ad agency, publisher, developer) has initiated ad campaign software installed on a device or a system. The user interface 500 includes an ad campaign region 510 for selecting one or more ad campaigns (e.g., ad campaigns for delivering in-app video ads to mobile devices, ad campaigns for delivering in-app video ads to any type of device) including ad campaigns 512, 514, 516, 518, and n. Each ad campaign is associated with a selectable cost information option including cost information option 522, cost information option 524, cost information option 526, cost information option 528, and cost information option n. For example, cost information may indicate a minimum bid or a maximum bid for an ad campaign. In one example, option 522 may be a $35 maximum bid for CPI on a certain app type, LTV, ROI, and engagement rate. Cost information option 524 may be a $25 maximum bid for CPI on a certain app type, LTV, ROI, and engagement rate. Cost information option 526 may be a $5 maximum bid for CPA on a certain app type, LTV, ROI, and engagement rate. Cost information option 528 may be a $2 maximum bid for CPA on a certain app type, LTV, ROI, and engagement rate. Cost information option n may be a $25 maximum bid for CPI on a certain app type, LTV, ROI, and engagement rate. In another embodiment, the type of ad campaign is a separate function with selectable options. In one example, the user interface only includes a single ad campaign with parameters and objectives for this ad campaign.

The function 530 includes selectable LTV options 532, 534, 536, 538, and n. Each ad campaign is associated with one of the selected LTV options. For example, ad campaign 514 may target users having a LTV of $50 or more while ad campaign 516 may target users having a LTV of $40 or more. Function 540 includes return on investment ROI options 542, 544, 546, 548, and n for defining ROI objectives for each ad campaign.

In one embodiment, the function n includes engagement rate options 552, 554, 556, 558, n. The engagement rate indicates how engaged a user is with an ad. For example, the ad campaign 512 may target users having a first engagement rate. The ad campaign 514 may target users having a second engagement rate. An advertiser may be willing to pay a greater amount for users having a higher engagement rate.

Figure 6:
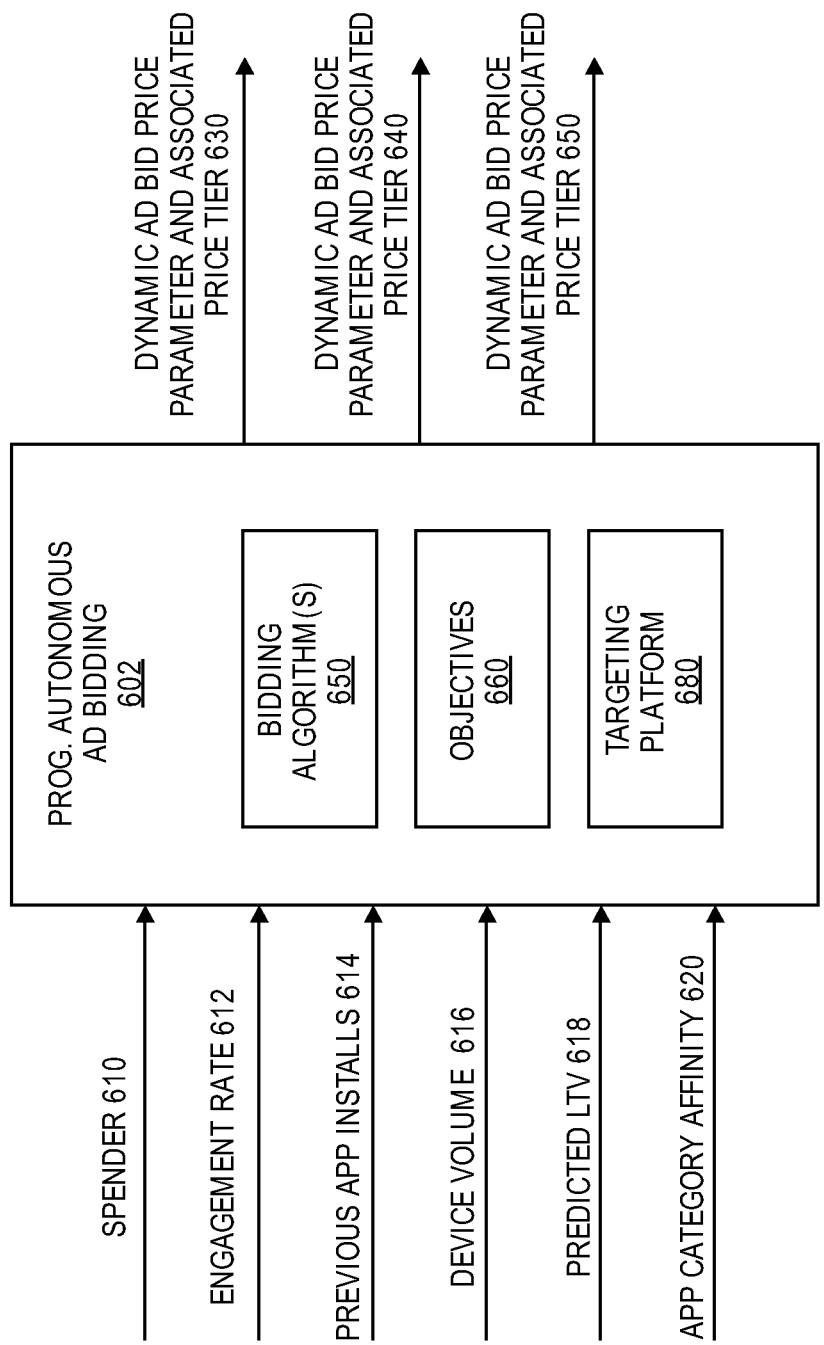
FIG. 6 illustrates an exemplary block diagram of ad bidding unit for programmatic autonomous advertising campaign bidding in accordance with one embodiment.

FIG. 6 illustrates an exemplary block diagram of an ad bidding unit for programmatic autonomous advertising campaign bidding in accordance with one embodiment. Initially, an ad bidding unit 602 (e.g., computing device, server, ad bidding component or module, etc.) determines or receives objectives for an advertising entity at operation 660 such as LTV and return on investment for an ad campaign. These objectives and other relevant parameters such as a bid price, which must be greater or equal to a minimum bid price, may be extracted from the bid on campaign function call 228 or from the creation of the ad campaign by the advertising entity. The ad bidding unit then receives input parameters which are applied to one more bidding algorithms 670 in order to programmatically generate dynamic bid price parameters and associated price tiers (e.g., dynamic bid price parameter and price tier 630, dynamic bid price parameter and price tier 640, dynamic bid price parameter and price tier 650). The parameters input into the ad bidding unit 602 include device characteristics (e.g., make and model of a user's device, network connection for user's device, whether user's device is mobile device or tablet device, OS version, volume, screen size and orientation, language setting) and user characteristics (e.g., user spend, conversion rate, engagement rate, app type, in-app purchase (IAP) activity, number of past application installs, time of last application install, etc.) from any source including the system 100, attributers 186, advertisers 184, and publishers 182. Additional parameters include segments of users such as nonpayers versus payers, social influence based on social media data, organic app installs, and predicted life time value (LTV) of a user.

In one embodiment, a targeting platform 680 determines a group of users that are predicted to satisfy the objectives of the advertising entity. In one example, the targeting platform locates users based on different parameters including user spending in a certain category of applications 610, a user engagement rate 612, which indicates how frequently a user watches an ad, previous app installs 614, device volume 616, predicted LTV 618, and affinity in the certain category of applications 620. A first group of users that satisfy desired characteristics (e.g., high spender is preferred to low spender, high device volume is preferred to low device volume) for all or most of these parameters (e.g., high spender, high engagement rate, numerous app installs, high predicted LTV, strong affinity for the certain category of applications) will be bid on by the bidding algorithm(s) 670. For example, a higher dynamic bid price parameter and price tier 630 (e.g., $25-35 per software application install) may be autonomously determined by the bidding algorithm(s)

670 of the advertising system (e.g., ad bidding component or module 603) for a first group of users. A publisher may set a maximum bid price (e.g., $35/install for CPI campaign, $5/action for CPA campaign) and the higher dynamic bid price parameter and price tier 630 and all other bid prices will need to be equal to or less than the maximum bid price.

In another example, a second group of users that satisfy desired characteristics for some by not all of these parameters will be bid on by the bidding algorithm(s) 670. For example, a lower dynamic bid price parameter and associated price tier 640 (e.g., $15-25 per install) may be autonomously determined by the bidding algorithm(s) 670 of the advertising system (e.g., ad bidding component or module 603) for the second group of users. A third group of users that satisfy desired characteristics for one or two of these parameters may also be bid on by the bidding algorithm(s) 670. For example, a lower dynamic bid price parameter and price tier 650 (e.g., $5-15 per install) may be autonomously determined by the bidding algorithm(s) 670 of the advertising system (e.g., ad bidding unit 602) for the third group of users. In a specific example, the ad bidding 602 sets a price tier (or market value price) for an ad campaign for a unique set of parameters (e.g., $5 bid from advertising entity for US or UK user, certain mobile device type or brand, historical IAP of greater than $25, etc.)

The ad bidding unit 602 (e.g., computing device, server, ad bidding component or module, etc.) of an advertising system provides autonomous bidding of ad campaigns with advanced targeting as described herein for improved targeting computer functionality and improved bidding functionality for determining a market value price for specific group(s) of users having desired characteristics or for a specific individual user. The ad bidding unit 602 allows an advertising entity to utilize a performance based ad campaign (e.g., CPI) to more quickly locate and target users based on objectives of the ad campaign such as locating high lifetime value users for satisfying ROI and LTV objectives. The ad bidding unit 602 also allows an advertising entity to utilize a non-performance based campaign (e.g., CPA) to more quickly locate and target users based on objectives of the ad campaign such as locating high lifetime value users for satisfying ROI and LTV objectives. The ad bidding unit 602 programmatically determines dynamic bid price parameters with multiple bid prices at different price tiers for different types of user groups to unlock ad inventory for performance based campaigns or non-performance based campaigns.

Figure 7:
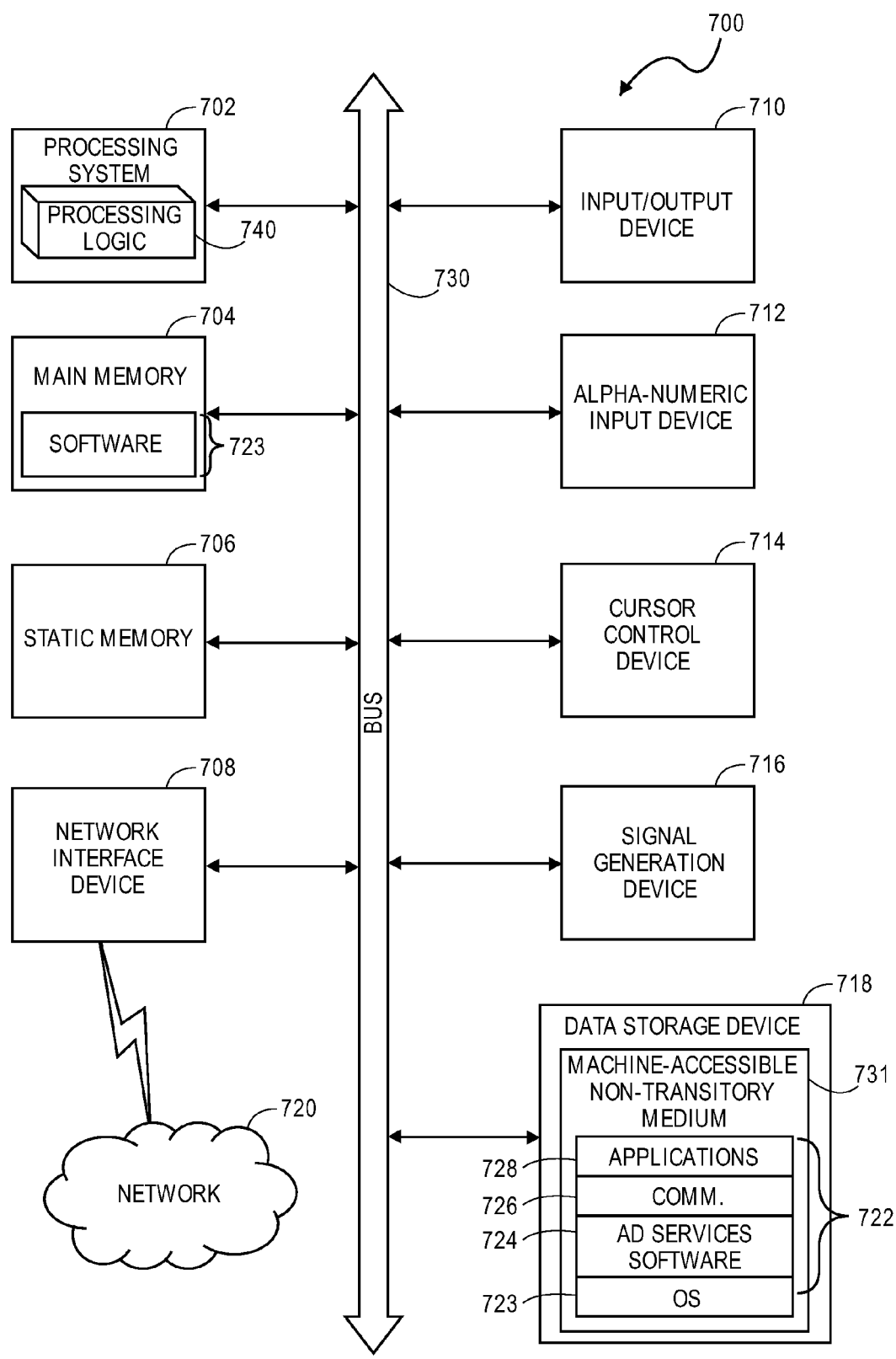
FIG. 7 illustrates a diagrammatic representation of a machine in the exemplary form of a device 700 within which a set of instructions, for causing the machine to perform any one or more of the methodologies discussed herein, may be executed in accordance with one embodiment.

FIG. 7 illustrates a diagrammatic representation of a machine in the exemplary form of a computer system or device 700 within which a set of instructions, for causing the machine to perform any one or more of the methodologies discussed herein, may be executed. In alternative embodiments, the machine may be connected (e.g., networked) to other machines in a LAN, an intranet, an extranet, or the Internet. The machine may operate in the capacity of a server or a client machine in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a mobile device, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary device 700 (e.g., system 100, system 201, device 203, advertising entity 220) includes a processing system 902, a main memory 704 (e.g., read-only memory (ROM), flash memory, dynamic random access memory (DRAM) such as synchronous DRAM (SDRAM) or Rambus DRAM (RDRAM), etc.), a static memory 706 (e.g., flash memory, static random access memory (SRAM), etc.), and a data storage device 718, which communicate with each other via a bus 730.

Processing system 702 represents one or more general-purpose processing devices such as one or more microprocessors, central processing units, or the like. More particularly, the processing system 702 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processing system 702 may also be one or more special-purpose processing devices such as an application specific integrated circuit (ASIC), a field programmable gate array (FPGA), a digital signal processor (DSP), network processor, or the like. The processing system 702 is configured to execute the processing logic 726 for performing the operations and steps discussed herein.

The device 700 may further include a network interface device 908 that may include RF circuitry for sending and receiving RF cellular signals, a wireless transceiver for WiFi, a USB component, a NFC component, or any other communications component for sending and receiving communications. The device 700 also may include an input/output device 710 (e.g., a display, a liquid crystal display (LCD), a plasma display, a cathode ray tube (CRT), touch display device, or touch screen for receiving user input and displaying output), an optional alphanumeric input device 712 (e.g., a keyboard), an optional cursor control device 714 (e.g., a mouse), and a signal generation device 716 (e.g., a speaker).

The data storage device 718 may include a machine-accessible non-transitory medium 731 on which is stored one or more sets of instructions (e.g., software 722) embodying any one or more of the methodologies or functions described herein. The software 722 may include an operating system 723, advertising services software 724 (e.g., SDK 724), communications module 726, and applications 728 (e.g., publisher applications). The software 722 may also reside, completely or at least partially, within the main memory 704 (e.g., software 723) and/or within the processing system 702 during execution thereof by the device 700, the main memory 704 and the processing system 702 also constituting machine-accessible storage media. The software 722 or 723 may further be transmitted or received over a network 720 via the network interface device 708.

The machine-accessible non-transitory medium 731 may also be used to store data structure sets that define user identifying states and user preferences that define user profiles. Data structure sets and user profiles may also be stored in other sections of device 700, such as static memory 706.

Figure 8:
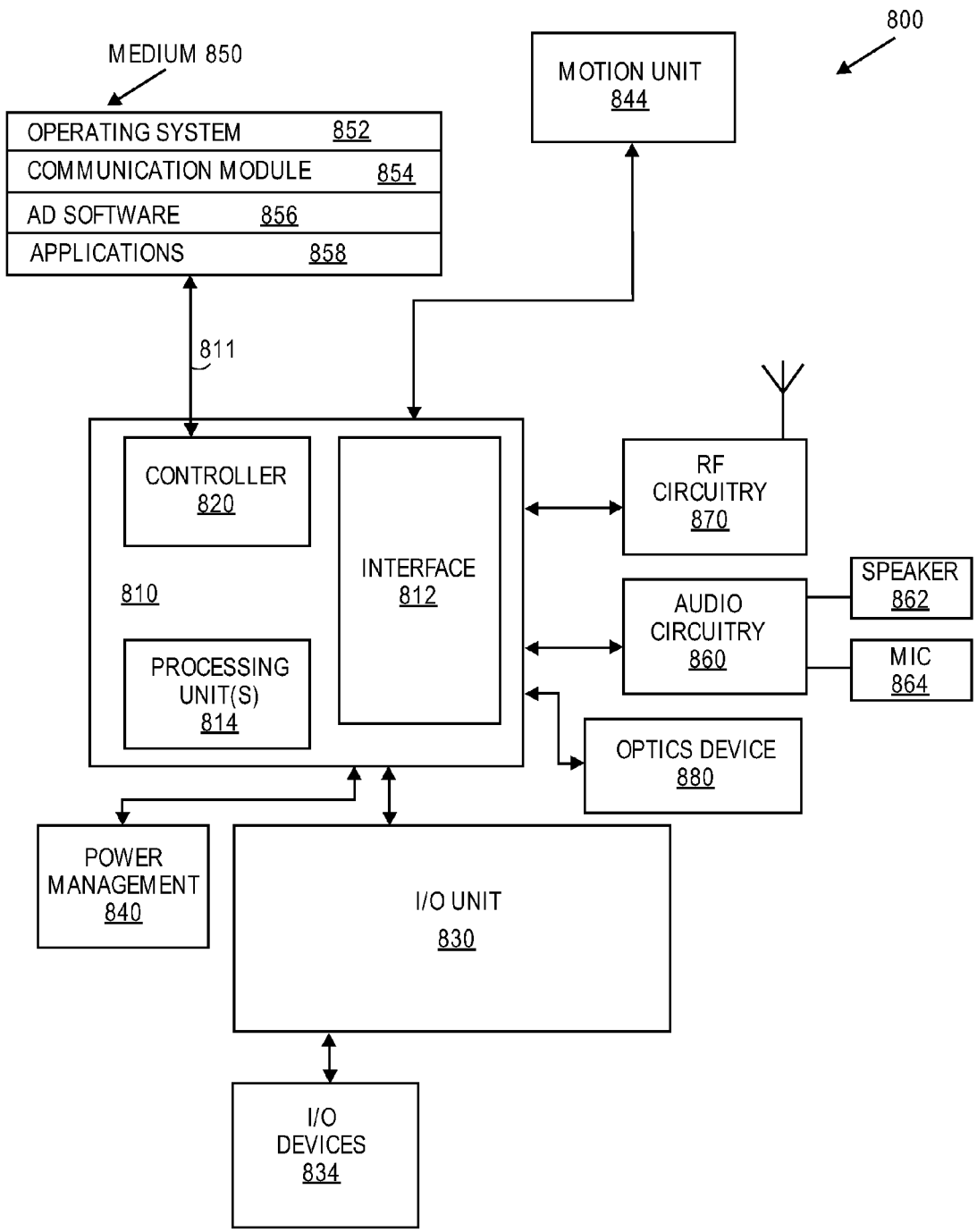
FIG. 8 is a block diagram of a wireless device 800 in accordance with one embodiment.

FIG. 8 is a block diagram of a wireless device 800 in accordance with one embodiment. The wireless device 800 (e.g., device 230, advertising entity 220) may be any type of wireless device (e.g., cellular phone, wireless phone, tablet, etc.) for sending and receiving wireless communications.

The wireless device includes a processing system 810 that includes a controller 820 and processing units 814. The processing system 810 communicates with an Input/Output (I/O) unit 830, radio frequency (RF) circuitry 870, audio circuitry 860, an optics device 860 for capturing one or more images or video, a motion unit 844 (e.g, an accelerometer, gyroscope, etc.) for determining motion data (e.g., in three dimensions) for the wireless device 800, power management system 840, and machine-accessible non-transitory medium 850. These components are coupled by one or more communication links or signal lines.

RF circuitry 870 is used to send and receive information over a wireless link or network to one or more other devices. Audio circuitry 860 is coupled to audio speaker 862 and microphone 864 and includes known circuitry for processing voice signals.

One or more processing units 814 communicate with one or more machine-accessible non-transitory mediums 850 (e.g., computer-readable medium) via controller 820. Medium 850 can be any device or medium (e.g., storage device, storage medium) that can store code and/or data for use by one or more processing units 814. Medium 850 can include a memory hierarchy, including but not limited to cache, main memory and secondary memory. The medium 850 stores one or more sets of instructions (or software) embodying any one or more of the methodologies or functions described herein. The software may include an operating system 852, advertising services software 856 (e.g., SDK 1056), communications module 854, and applications 858 (e.g., publisher applications, developer applications, a web browser, html5 applications, etc.). The software may also reside, completely or at least partially, within the medium 850 or within the processing units 814 during execution thereof by the device 800. The components shown in FIG. 8 may be implemented in hardware, software, firmware or any combination thereof, including one or more signal processing and/or application specific integrated circuits.

Communication module 854 enables communication with other devices. The I/O unit 830 communicates with different types of input/output (I/O) devices 834 (e.g., a display, a liquid crystal display (LCD), a plasma display, a cathode ray tube (CRT), touch display device, or touch screen for receiving user input and displaying output, an optional alphanumeric input device).

In one embodiment, a machine-accessible non-transitory medium contains executable computer program instructions which when executed by a data processing system cause the system to perform any of the methods discussed herein. While the machine-accessible non-transitory medium 850 is shown in an exemplary embodiment to be a single medium, the term "machine-accessible non-transitory medium" should be taken to include a single medium or multiple media (e.g., a centralized or distributed database, and/or associated caches and servers) that store the one or more sets of instructions. The term "machine-accessible non-transitory medium" shall also be taken to include any medium that is capable of storing, encoding or carrying a set of instructions for execution by the machine and that cause the machine to perform any one or more of the methodologies of the present invention. The term "machine-accessible non-transitory medium" shall accordingly be taken to include, but not be limited to, solid-state memories, optical and magnetic media, and carrier wave signals.

In one embodiment, an advertising system for autonomous bidding of advertisement (ad) inventory includes an ad bidding component or module of an ad server and a storage medium coupled to the ad server. The storage medium stores instructions including instructions of the ad bidding component or module and instructions of the ad server. The advertising system includes processing logic that is coupled to the storage medium. The processing logic is configured to execute the instructions of the storage medium to receive a bid campaign function call for an ad campaign from an advertising entity, process the bid campaign function call, determine objectives for the advertising entity including life time value (LTV) for users and return on investment (ROI) for the ad campaign, determine targeted users having characteristics appropriate for satisfying the objectives of the advertising entity, and autonomously determine a first dynamic ad bid price parameter and associated first group of targeted users that satisfy the objectives of the advertising entity based on having characteristics that satisfy at least three different parameters including user spending in a certain category of applications and predicted LTV.

In one embodiment, the processing logic is further configured to execute the instructions to determine a second dynamic ad bid price parameter and associated second group of targeted users that satisfy the objectives of the advertising entity based on having characteristics that satisfy at least two of the different parameters.

In one embodiment, the processing logic is further configured to execute the instructions to determine a third dynamic ad bid price parameter and associated third group of targeted users that satisfy the objectives of the advertising entity based on having characteristics that satisfy at least one of the different parameters.

In one example, the different parameters further include a user engagement rate, previous application installs, device volume, and affinity in the certain category of applications.

In another example, the first dynamic ad bid price parameter is associated with a first price tier that is greater than a second price tier that is associated with the second dynamic ad bid price parameter. The second price tier is greater than a third price tier that is associated with the third dynamic ad bid price parameter.

In one embodiment, the first group of users having characteristics that satisfy at least three different parameters satisfy user spending in a certain category of applications by having user spending greater than a spending threshold and satisfy predicted LTV by having a predicted LTV greater than a LTV threshold. The thresholds may be defined by the advertising system or the advertising entity.

In one embodiment, a machine-accessible non-transitory medium containing executable computer program instructions which when executed by an advertising system cause the advertising system to perform a method for autonomous bidding of advertisement (ad) inventory. The method includes receiving, with the advertising system, a bid campaign function call for an ad campaign from an advertising entity, processing the bid campaign function call, determining objectives for the advertising entity including life time value (LTV) for users and return on investment (ROI) for the ad campaign based on processing the bid campaign function call, determining targeted users having characteristics appropriate for satisfying the objectives of the advertising entity, and autonomously determining a first dynamic ad bid price parameter and associated first group of targeted users that satisfy the objectives of the advertising entity based on having characteristics that satisfy at least three different parameters including user spending in a certain category of applications and predicted LTV.

The method further includes determining a second dynamic ad bid price parameter and associated second group of targeted users that satisfy the objectives of the advertising entity based on having characteristics that satisfy at least two of the different parameters. The method further includes determining a third dynamic ad bid price parameter and associated third group of targeted users that satisfy the objectives of the advertising entity based on having characteristics that satisfy at least one of the different parameters.

In one example, the different parameters further include a user engagement rate, application installs, device volume, and affinity in the certain category of applications. The first dynamic ad bid price parameter is associated with a first price tier that is greater than a second price tier that is associated with the second dynamic ad bid price parameter. The second price tier is greater than a third price tier that is associated with the third dynamic ad bid price parameter.

In one embodiment, the first group of users having characteristics that satisfy at least three different parameters satisfy user spending in a certain category of applications by having user spending greater than a spending threshold and satisfy predicted LTV by having a predicted LTV greater than a LTV threshold.

In one embodiment, a method for providing programmatic bidding of advertisement (ad) inventory includes receiving, with the advertising system, a bid campaign function call for an ad campaign from an advertising entity, processing, with the advertising system, the bid campaign function call, determining objectives for the advertising entity including life time value (LTV) for users and return on investment (ROI) for the ad campaign based on processing the bid campaign function call, determining targeted users having characteristics appropriate for satisfying the objectives of the advertising entity, and autonomously determining a first dynamic ad bid price parameter and associated first group of targeted users that satisfy the objectives of the advertising entity based on having characteristics that satisfy at least three different parameters including user spending in a certain category of applications and predicted LTV.

In one embodiment, the method further includes determining a second dynamic ad bid price parameter and associated second group of targeted users that satisfy the objectives of the advertising entity based on having characteristics that satisfy at least two of the different parameters. The method further includes determining a third dynamic ad bid price parameter and associated third group of targeted users that satisfy the objectives of the advertising entity based on having characteristics that satisfy at least one of the different parameters.

In one example, the different parameters further include a user engagement rate, application installs, device volume, and affinity in the certain category of applications.

In one example, the first group of users having characteristics that satisfy at least three different parameters satisfy user spending in a certain category of applications by having user spending greater than a spending threshold and satisfy predicted LTV by having a predicted LTV greater than a LTV threshold.

In one embodiment, a computing system for autonomous bidding of advertisement (ad) inventory includes a storage medium to store instructions including instructions of ad campaign software and processing logic that is coupled to the storage medium. The processing logic is configured to execute the instructions of the ad campaign software to receive selection input for customizing a bid for an ad campaign including one or more parameters of the ad campaign for defining objectives for the ad campaign, generating a bid campaign function call for an ad campaign from an advertising entity in response to the selection input, and send the bid campaign function call to the advertising system. The processing logic is further configured to receive a response from an advertising system with the response including features or functions of the ad campaign including a first dynamic ad bid price parameter and associated first group of targeted users that satisfy the objectives of the advertising entity based on having characteristics that satisfy at least three different parameters including user spending in a certain category of applications and predicted LTV.

In one embodiment, the processing logic is further configured to execute the instructions to receive a second dynamic ad bid price parameter and associated second group of targeted users that satisfy the objectives of the advertising entity based on having characteristics that satisfy at least two of the different parameters.

The processing logic is further configured to execute the instructions to receive a third dynamic ad bid price parameter and associated third group of targeted users that satisfy the objectives of the advertising entity based on having characteristics that satisfy at least one of the different parameters.

In one example, the different parameters further include a user engagement rate, application installs, device volume, and affinity in the certain category of applications.

In the foregoing specification, the invention has been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. An advertising system for autonomous bidding of advertisement (ad) inventory, comprising: an ad bidding component or module of an ad server with improved targeting computer functionality, real time bidding functionality for third party auction participants bidding in real time during an ad auction, and improved bidding functionality for autonomously determining dynamic bid price parameters with multiple bid prices at different price tiers for different types of targeted user groups and associated wireless devices for users of the user groups; a storage medium coupled to the ad server, the storage medium to store instructions including instructions of the ad bidding component or module; and processing logic coupled to the storage medium, the processing logic of the advertising system is configured to execute the instructions of the storage medium to receive a cost-per-install (CPI) bid campaign function call for an in-app video ad campaign from an advertising entity, process the CPI bid campaign function call, determine objectives for the advertising entity including life time value (LTV) for users and return on investment (ROI) for the CPI ad campaign, determine different types of groups of targeted users having characteristics appropriate for satisfying the objectives of the advertising entity, and autonomously dynamically determine a first price tier of a first dynamic ad bid price parameter per software application install for a first time period and associated first group of targeted users that satisfy the objectives of the advertising entity based on having characteristics that satisfy at least three different parameters including user spending in a certain category of software applications, user engagement rate for an ad, and predicted LTV of the first group of targeted users, wherein the processing logic of the advertising system is further configured to execute instructions to dynamically determine a second price tier for the first dynamic ad bid price parameter per software application install when at least one device characteristic including a device volume of at least one wireless device changes for at least one user of the first group of users, wherein the processing logic is further configured to execute the instructions to determine a second dynamic ad bid price parameter and associated second group of targeted users that satisfy the objectives of the advertising entity based on having characteristics that satisfy at least two of the different parameters.

2. The advertising system of claim 1, wherein the processing logic is further configured to execute the instructions to determine a third dynamic ad bid price parameter and associated third group of targeted users that satisfy the objectives of the advertising entity based on having characteristics that satisfy at least one of the different parameters.

3. The advertising system of claim 1, wherein the different parameters further include a user engagement rate, previous application installs, device volume, and affinity in the certain category of applications.

4. The advertising system of claim 1, wherein the first dynamic ad bid price parameter is a first price tier that is greater than a second price tier of the second dynamic ad bid price parameter, wherein the second price tier is greater than a third price tier of the third dynamic ad bid price parameter.

5. The advertising system of claim 1, wherein the first group of users having characteristics that satisfy at least three different parameters satisfy user spending in a certain category of applications by having user spending greater than a spending threshold and satisfy predicted LTV by having a predicted LTV greater than a LTV threshold.

6. A machine-accessible non-transitory tangible storage medium containing executable computer program instructions which when executed by an advertising system cause the advertising system to perform a method for autonomous bidding of advertisement (ad) inventory, the method comprising: receiving, with an ad bidding component or module of the advertising system, a cost-per-install (CPI) bid campaign function call for an in-app video ad campaign from an advertising entity, wherein the ad bidding component or module provides improved targeting computer functionality and real time bidding functionality for third party auction participants bidding in real time during an ad auction; processing the (CPI) bid campaign function call; determining objectives for the advertising entity including life time value (LTV) for users and return on investment (ROI) for the CPI ad campaign based on processing the (CPI) bid campaign function call; determining different types of groups of targeted users and associated wireless devices for users of the user groups having characteristics appropriate for satisfying the objectives of the advertising entity; autonomously dynamically determining a first price tier of a first dynamic ad bid price parameter and associated first group of targeted users that satisfy the objectives of the advertising entity based on having characteristics that satisfy at least three different parameters including user spending in a certain category of applications, user engagement rate for an ad, and predicted LTV of the first group of targeted users; dynamically determining a second price tier for the first dynamic ad bid price parameter per software application install when at least one device characteristic including a device volume of at least one wireless device changes for at least one user of the first group of users; and determining a second dynamic ad bid price parameter and associated second group of targeted users that satisfy the objectives of the advertising entity based on having characteristics that satisfy at least two of the different parameters.

7. The machine-accessible non-transitory tangible storage medium of claim 6, wherein the method further comprises determining a third dynamic ad bid price parameter and associated third group of targeted users that satisfy the objectives of the advertising entity based on having characteristics that satisfy at least one of the different parameters.

8. The machine-accessible non-transitory tangible storage medium of claim 6, wherein the different parameters further include a user engagement rate, application installs, device volume, and affinity in the certain category of applications.

9. The machine-accessible non-transitory tangible storage medium of claim 6, wherein the first dynamic ad bid price parameter is a first price tier that is greater than a second price tier of the dynamic ad bid price parameter, wherein the second price tier is greater than a third price tier of the dynamic ad bid price parameter.

10. The machine-accessible non-transitory tangible storage medium of claim 6, wherein the first group of users having characteristics that satisfy at least three different parameters satisfy user spending in a certain category of applications by having user spending greater than a spending threshold and satisfy predicted LTV by having a predicted LTV greater than a LTV threshold.

11. A method for providing programmatic bidding of advertisement (ad) inventory, comprising: receiving, with an ad bidding component or module of the advertising system, a cost-per-install (CPI) bid campaign function call for an in-app video ad campaign from an advertising entity, wherein the ad bidding component or module provides improved targeting computer functionality and real time bidding functionality for third party auction participants bidding in real time during an ad auction; processing, with the advertising system, the bid campaign function call; determining objectives for the advertising entity including life time value (LTV) for users and return on investment (ROI) for the CPI ad campaign based on processing the (CPI) bid campaign function call; determining different types of groups of targeted users having characteristics appropriate for satisfying the objectives of the advertising entity; autonomously dynamically determining a first price tier of a first dynamic ad bid price parameter per software application install and associated first group of targeted users that satisfy the objectives of the advertising entity based on having characteristics that satisfy at least three different parameters including user spending in a certain category of applications, user engagement rate for an ad, and predicted LTV of the first group of targeted users; dynamically determining a second price tier for the first dynamic ad bid price parameter per software application install when at least one device characteristic including a device volume of at least one wireless device changes for at least one user of the first group of users; and determining a second dynamic ad bid price parameter and associated second group of targeted users that satisfy the objectives of the advertising entity based on having characteristics that satisfy at least two of the different parameters.

12. The method of claim 11, wherein the method further comprises determining a third dynamic ad bid price parameter and associated third group of targeted users that satisfy the objectives of the advertising entity based on having characteristics that satisfy at least one of the different parameters.

13. The method of claim 11, wherein the different parameters further include a user engagement rate, application installs, device volume, and affinity in the certain category of applications.

14. The method of claim 11, wherein the first group of users having characteristics that satisfy at least three different parameters satisfy user spending in a certain category of applications by having user spending greater than a spending threshold and satisfy predicted LTV by having a predicted LTV greater than a LTV threshold.

15. A computing system for autonomous bidding of advertisement (ad) inventory, comprising: a storage medium to store instructions of ad campaign software; and processing logic coupled to the storage medium, the processing logic is configured to execute the instructions of the ad campaign software to receive selection input for customizing a bid for an in-app video ad campaign including one or more parameters of the ad campaign for defining objectives for the ad campaign, generating a cost-per-install (CPI) bid campaign function call for the in-app video ad campaign from an advertising entity in response to the selection input, receive a response from an advertising system with the response including features or functions of the ad campaign including a dynamically determined first price tier of a first dynamic ad bid price parameter per software application install and associated first group of targeted users that satisfy the objectives of the advertising entity based on having characteristics that satisfy at least three different parameters including user spending in a certain category of applications, user engagement rate for an ad, and predicted life time value (LTV) of the first group of targeted users, wherein the processing logic is further configured to execute instructions to receive a dynamically determined second price tier of the first dynamic ad bid price parameter per software application install when at least one device characteristic including a device volume of at least one wireless device changes for at least one user of the first group of targeted users, wherein the processing logic is further configured to execute the instructions to receive a second dynamic ad bid price parameter and associated second group of targeted users that satisfy the objectives of the advertising entity based on having characteristics that satisfy at least two of the different parameters, wherein the processing logic is further configured to execute instructions for real time bidding functionality for bidding in real time during an ad auction.

16. The computing system of claim 15, wherein the processing logic is further configured to execute the instructions to receive a third dynamic ad bid price parameter and associated third group of targeted users that satisfy the objectives of the advertising entity based on having characteristics that satisfy at least one of the different parameters.

17. The computing system of claim 15, wherein the different parameters further include a user engagement rate, application installs, device volume, and affinity in the certain category of applications.

18. The advertising system of claim 1, wherein the at least one device characteristic comprises at least one of make and model of the at least one wireless device, network connection for the at least one wireless device, whether the at least wireless device is a mobile device or a tablet device, operating system (OS) version, volume setting, screen size and orientation, and language setting.

* * * * *